US009973311B2

(12) United States Patent
Xu

(10) Patent No.: US 9,973,311 B2
(45) Date of Patent: May 15, 2018

(54) METHOD AND APPARATUS FOR TRANSMITTING INFORMATION ON ENHANCED PHYSICAL DOWNLINK CONTROL CHANNEL

(71) Applicant: Huawei Device Co., Ltd., Shenzhen, P.R. (CN)

(72) Inventor: Kai Xu, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 23 days.

(21) Appl. No.: 14/537,604

(22) Filed: Nov. 10, 2014

(65) Prior Publication Data

US 2015/0063281 A1 Mar. 5, 2015

Related U.S. Application Data

(63) Continuation of application No. PCT/CN2013/075134, filed on May 3, 2013.

(30) Foreign Application Priority Data

May 10, 2012 (CN) .......................... 2012 1 0143521

(51) Int. Cl.
*H04L 5/00* (2006.01)
*H04W 16/02* (2009.01)
*H04W 72/04* (2009.01)

(52) U.S. Cl.
CPC .......... *H04L 5/0048* (2013.01); *H04L 5/0051* (2013.01); *H04L 5/0053* (2013.01);
(Continued)

(58) Field of Classification Search
CPC ... H04L 5/0048; H04L 5/0053; H04L 5/0051; H04L 5/0094; H04L 5/0044; H04W 72/0446; H04W 16/02
See application file for complete search history.

(56) References Cited

U.S. PATENT DOCUMENTS

| | | | |
|---|---|---|---|
| 2012/0093063 A1 | 4/2012 | Yuan et al. | |
| 2012/0250663 A1 | 10/2012 | Han et al. | |
| 2013/0039284 A1* | 2/2013 | Marinier | H04L 5/001 370/329 |

FOREIGN PATENT DOCUMENTS

| | | |
|---|---|---|
| CN | 102420685 A | 4/2012 |
| EP | 2 779 774 A1 | 9/2014 |

(Continued)

OTHER PUBLICATIONS

"Design Consideration for E-PDCCH", Research in Motion, UK Limited, 3GPP TSG RAN WG1 Meeting #66, Aug. 22-26, 2011, 6 pages.

(Continued)

*Primary Examiner* — Jackie Zuniga Abad

(57) ABSTRACT

In transmitting information on an enhanced physical downlink control channel, it obtains, according to a first aggregation level to which a first E-PDCCH candidate belongs, a first eCCE or a CCE resource to which the first E-PDCCH candidate is mapped in a first PRB resource, where eCCE or CCE resources to which E-PDCCH candidates on the first aggregation level are mapped in the first PRB resource are different from each other, and the first PRB resource includes a PRB in which an E-PDCCH candidate on each aggregation level and a PDSCH in each subframe are multiplexed; it determines a first DMRS port corresponding to a reference signal corresponding to the first E-PDCCH candidate; and respectively transmits, on a subcarrier corresponding to the first DMRS port and the first eCCE or CCE resource, the reference signal and a data part corresponding to the first E-PDCCH candidate.

52 Claims, 9 Drawing Sheets

(52) U.S. Cl.
CPC ....... *H04W 16/02* (2013.01); *H04W 72/0446* (2013.01); *H04L 5/0044* (2013.01); *H04L 5/0094* (2013.01)

(56) References Cited

FOREIGN PATENT DOCUMENTS

| | | |
|---|---|---|
| WO | WO 2011/062384 A2 | 5/2011 |
| WO | WO 2011/132988 A2 | 10/2011 |

OTHER PUBLICATIONS

"Search Space Design for E-PDCCH", Research in Motion, UK Limited, 3GPP TSG RAN WG1 Meeting #68, Feb. 6-10, 2012, 6 pages.

"Considerations on search spaces for the E-PDCCH", Nokia, Nokia Siemens Networks, 3GPP TSG RAN WG1 #68 Meeting, Feb. 6-10, 2012, 5 pages.

"EPDCCH Design Aspects", Motorola Mobility, 3GPP TSG RAN WG1 Meeting #68bis, Mar. 26-30, 2012, 3 pages.

"Further Discussions on DMRS-Based E-PDCCH Transmission", Samsung, 3GPP TSG RAN WG1 #68bis, Mar. 26-30, 2012, 7 pages.

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.

"3rd Generation Partnership Project; Technical Specification Group Radio Access Network; Evolved Universal Terrestrial Radio Access (E-UTRA); Physical layer procedures (Release 10)", 3GPP TS 36.213 V10.5.0, Mar. 2012, 125 pages.

\* cited by examiner

| R | R | e0 | e0 | R | AP | AP | R | R | e0 | e0 | R | AP | AP |
|---|---|----|----|---|----|----|---|---|----|----|---|----|----|
| P | P | e0 | e0 | e0 | AP | AP | e0 | e0 | e0 | e0 | e0 | AP | AP |
| P | P | e0 | e0 | e0 | e0 | e0 | e0 | e0 | e0 | e0 | e0 | e0 | e0 |
| R | R | e1 | e1 | R | e1 | e1 | R | R | e1 | e1 | R | e1 | e1 |
| P | P | e1 | e1 | e1 | e1 | e1 | e1 | e1 | e1 | e1 |   | e1 | e1 |
| P | P | e1 | e1 | e1 | AP | AP | e1 | e1 | e1 | e1 | e1 | AP | AP |
| R | R | e2 | e2 | R | AP | AP | R | R | e2 | e2 | R | AP | AP |
| P | P | e2 | e2 | e2 | e2 | e2 | e2 | e2 | e2 | e2 | e2 | e2 | e2 |
| P | P | e2 | e2 | e2 | e2 | e2 | e2 | e2 | e2 | e2 | e2 | e2 | e2 |
| R | R | e3 | e3 | R | e3 | e3 | R | R | e3 | e3 | R | e3 | e3 |
| P | P | e3 | e3 | e3 | AP | AP | e3 | e3 | e3 | e3 | e3 | AP | AP |
| P | P | e3 | e3 | e3 | AP | AP | e3 | e3 | e3 | e3 | e3 | AP | AP |

METHOD AND APPARATUS FOR TRANSMITTING INFORMATION ON ENHANCED PHYSICAL DOWNLINK CONTROL CHANNEL

CROSS-REFERENCE TO RELATED APPLICATIONS

This application is a continuation of International Application No. PCT/CN2013/075134, filed on May 3, 2013, which claims priority to Chinese Patent Application No. 201210143521.3, filed on May 10, 2012, both of which are hereby incorporated by reference in their entireties.

TECHNICAL FIELD

The present invention relates to communications technologies, and in particular, to a method and apparatus for transmitting information on an enhanced physical downlink control channel.

BACKGROUND

In a 3rd Generation Partnership Project (3rd Generation Partnership Project, 3GPP) Long Term Evolution (Long Term Evolution, LTE) or LTE-advanced (LTE-advanced, LTE-A) system, an orthogonal frequency division multiple access (Orthogonal Frequency Division Multiple Access, OFDMA) mode is generally used as a downlink multiple access mode. Downlink resources of the system are divided into OFDM symbols in terms of time, and are divided into subcarriers in terms of frequencies. A subcarrier in an OFDM symbol is referred to as a resource element (Resource Element, RE). In LTE release (Release) 8/9/10, a resource block (Resource Block, RB) is defined. One RB includes 12 subcarriers in a frequency domain, and is one timeslot in a time domain, that is, it includes 7 or 6 OFDM symbols. Therefore, one RB includes 84 or 72 REs. In same subcarriers in a subframe, a pair of RBs of two timeslots is referred to as a resource block pair (RB pair), namely, a PRB.

In an LTE system of LTE release 10 or earlier, a physical downlink control channel (Physical Downlink Control Channel, PDCCH) and a physical downlink shared channel (Physical Downlink Shared Channel, PDSCH) are time division multiplexed in a subframe. The PDCCH is carried in the first n OFDM symbols in a subframe, where n may be any one of 1, 2, 3, and 4. In the frequency domain, and the PDCCH is distributed over an entire system bandwidth after interleaving processing. The PDSCH scheduled by the PDCCH is mapped starting from an $(n+1)^{th}$ OFDM symbol in the subframe. A complete PDCCH includes one or several control channel elements (Control Channel Element, CCE). One CCE includes 9 resource element groups (Resource Element Group, REG). One REG occupies 4 REs. In LTE release 8/9/10, one PDCCH may include 1, 2, 4, or 8 CCEs, that is, corresponding aggregation levels are 1, 2, 4, and 8 respectively, and quantities of PDCCH candidates on the aggregation levels are 6, 6, 2, and 2 respectively. When a base station transmits a PDCCH, it needs to determine CCE resources to which PDCCH candidates on the different aggregation levels are mapped.

In an LTE system later than release 10, for example, in LTE release 11, due to introduction of technologies such as multi-user multiple-input multiple-output (Multiple-Input Multiple-Output, MIMO) and coordinated multi-point (Co-ordinated Multi-Points, CoMP) transmission, a capacity of a control channel is limited. Therefore, a PDCCH transmitted based on a MIMO precoding mode is introduced. This PDCCH may be demodulated based on a UE-specific demodulation reference signal (Demodulation Reference Signals, DMRS), and is referred to as an enhanced PDCCH (Enhanced-PDCCH, E-PDCCH). The E-PDCCH is not in a control region of the first n OFDM symbols in a subframe, but in a region for transmitting downlink data in the subframe. In addition, the E-PDCCH and PDSCH are multiplexed in the data region of the subframe in a frequency division multiplexing (Frequency Division Multiplexing, FDM) mode. As may be seen from the foregoing description, time-frequency resources occupied by the E-PDCCH are different from those occupied by the PDCCH in the prior art, and a PDCCH transmission mode cannot be directly used to transmit the E-PDCCH. Therefore, a transmission problem of the E-PDCCH needs to be solved.

SUMMARY

The present invention provides a method and apparatus for transmitting information on an enhanced physical downlink control channel to solve a transmission problem of the E-PDCCH.

One aspect of the present invention provides a method for transmitting information on an enhanced physical downlink control channel, including:

obtaining, according to a first aggregation level to which a first E-PDCCH candidate belongs, a first eCCE or CCE resource to which the first E-PDCCH candidate is mapped in a first PRB resource, where the first eCCE or CCE resource includes an eCCE or a CCE for transmitting a data part corresponding to the first E-PDCCH candidate, eCCE or CCE resources to which E-PDCCH candidates on the first aggregation level are mapped in the first PRB resource are different from each other, the first PRB resource includes a PRB in which an E-PDCCH on each aggregation level candidate and a PDSCH in each subframe are multiplexed, and the first E-PDCCH candidate is an E-PDCCH to be transmitted;

determining a first DMRS port corresponding to a reference signal corresponding to the first E-PDCCH candidate; and respectively transmitting, on a subcarrier corresponding to the first DMRS port and the first eCCE or CCE resource, the reference signal and the data part corresponding to the first E-PDCCH candidate.

One aspect of the present invention provides a base station, including:

an obtaining module, configured to obtain, according to a first aggregation level to which a first enhanced physical downlink control channel E-PDCCH candidate belongs, a first eCCE or CCE resource to which the first E-PDCCH candidate is mapped in a first PRB resource, where the first eCCE or CCE resource includes an eCCE or a CCE for transmitting a data part corresponding to the first E-PDCCH candidate, eCCE or CCE resources to which E-PDCCH candidates on the first aggregation level are mapped in the first PRB resource are different from each other, the first PRB resource includes a PRB in which an E-PDCCH candidate on each aggregation level and a PDSCH in each subframe are multiplexed, and the first E-PDCCH candidate is an E-PDCCH to be transmitted;

a first determining module, configured to determine a first DMRS port corresponding to a reference signal corresponding to the first E-PDCCH candidate; and a transmitting module, configured to respectively transmit, on a subcarrier corresponding to the first DMRS port and the first eCCE or CCE resource, the reference signal and the data part corresponding to the first E-PDCCH candidate.

Another aspect of the present invention provides a method for receiving information on an enhanced physical downlink control channel, including:

determining a first demodulation reference signal DMRS port corresponding to a reference signal corresponding to a first E-PDCCH candidate, where the first E-PDCCH candidate is an E-PDCCH to be received;

receiving the reference signal on a subcarrier corresponding to the first DMRS port; and performing blind detection in a first PRB resource according to the reference signal, so as to receive a data part corresponding to the first E-PDCCH candidate, where the first PRB resource includes a PRB in which an E-PDCCH candidate on each aggregation level and a PDSCH in each subframe are multiplexed.

Another aspect of the present invention provides a user equipment, including:

a second determining module, configured to determine a first demodulation reference signal DMRS port corresponding to a reference signal of a first enhanced physical downlink control channel E-PDCCH candidate, where the first E-PDCCH candidate is an E-PDCCH to be received;

a first receiving module, configured to receive the reference signal on a subcarrier corresponding to the first DMRS port; and a second receiving module, configured to perform blind detection in a first PRB resource according to the reference signal, so as to receive a data part corresponding to the first E-PDCCH candidate, where the first PRB resource includes a PRB in which an E-PDCCH candidate on each aggregation level and a PDSCH in each subframe are multiplexed.

According to the method and base station for transmitting information on an enhanced physical downlink control channel provided by the one aspect of the present invention, an E-PDCCH to be transmitted is mapped, according to an aggregation level of the E-PDCCH to be transmitted, to an eCCE in a PRB resource that is used for transmitting an E-PDCCH, a DMRS port occupied for transmitting a reference signal of the E-PDCCH to be transmitted is determined, and then the E-PDCCH to be transmitted is transmitted on a subcarrier corresponding to the determined DMRS port and the mapped eCCE resource, thereby solving the transmission problem of the E-PDCCH.

According to the method and user equipment for receiving information on an enhanced physical downlink control channel provided by the another aspect of the present invention, a DMRS port corresponding to a reference signal of an E-PDCCH to be received is determined, the reference signal of the E-PDCCH to be received is received on the DMRS port, and blind detection is performed, based on the received reference signal, on a PRB resource that transmits the E-PDCCH, so as to receive a data part corresponding to the E-PDCCH to be received, thereby solving a reception problem of the E-PDCCH.

BRIEF DESCRIPTION OF THE DRAWINGS

To describe the technical solutions in the embodiments of the present invention more clearly, the following briefly introduces the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by persons of ordinary skill in the art based on the embodiments of the present invention without creative efforts shall fall within the protection scope of the present invention.

In the following embodiments of the present invention, similar to a PDCCH in the prior art, transmission of an E-PDCCH includes two parts, namely, a reference signal part and a data part. To solve a transmission problem of the E-PDCCH is to solve a problem of how to determine a DMRS port corresponding to a reference signal of the E-PDCCH and a problem of how to map the data part corresponding to the E-PDCCH to a time-frequency resource.

Similar to CCEs of a PDCCH that are divided in release 8/9/10, similar concepts also exist in a structure of the E-PDCCH in the following embodiments of the present invention. Generally, there are many REs in a PRB that may be used for transmitting the data part corresponding to the E-PDCCH. It is uneconomical to use all the REs to transmit E-PDCCHs of a same UE. Therefore, similar to the concept of the CCE, the REs are divided into several control channel elements of an E-PDCCH. A control channel element of an E-PDCCH in this embodiment may be referred to as an enhanced CCE (enhanced Control Channel Element, eCCE), or still inherits the concept of the CCE of a conventional PDCCH. To distinguish from the prior art, an eCCE is used as an example for description in the embodiments of the present invention.

Figures 1, 2:
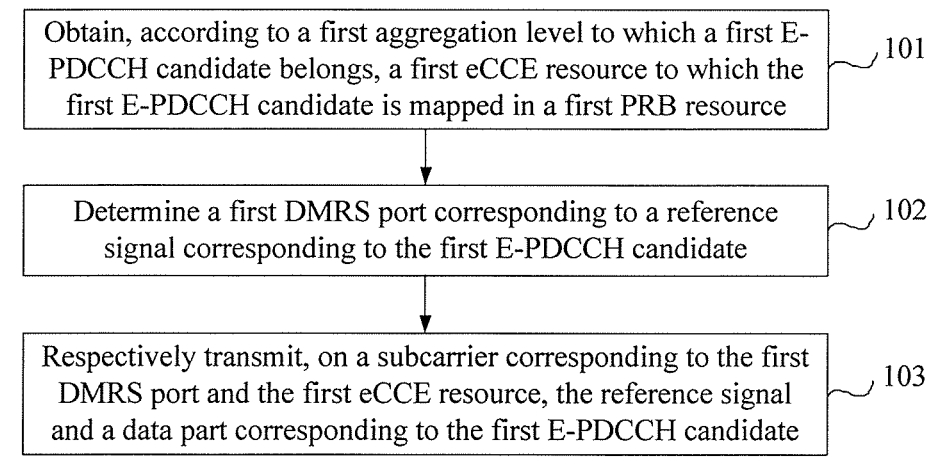
FIG. 1 is a schematic diagram of status of eCCEs obtained by means of division in a PRB according to an embodiment of the present invention.
FIG. 2 is a flowchart of a method for transmitting information on an E-PDCCH according to an embodiment of the present invention.

The E-PDCCH may be an aggregation of one or more eCCEs. Herein each eCCE is not restricted to having a same quantity of REs. FIG. 1 is a schematic diagram of status of eCCEs obtained by means of division in a PRB. As shown in FIG. 1, "R" indicates an RE occupied by a cell-specific reference signal (Cell-specific Reference Signals, CRS), "P" indicates an RE occupied by an existing PDCCH, "AP" indicates an RE occupied by a DMRS port, "e0" indicates an eCCE0 that is obtained by means of division, "e1" indicates an eCCE1 that is obtained by means of division, "e2" indicates an eCCE2 that is obtained by means of division, and "e3" indicates an eCCE3 that is obtained by means of division. In FIG. 1, except the RE occupied by the CRS, the RE occupied by a subsequent compatible conventional PDCCH, and an RE occupied by a DMRS of the E-PDCCH, the data part corresponding to the E-PDCCH is divided into 4 eCCEs, which are the eCCE0, eCCE1, eCCE2, and eCCE3. FIG. 1 illustrates only an example of eCCE division, and does not limit eCCE division by using this method.

In the following embodiments of the present invention, the E-PDCCH may also include 1 eCCE, 2 eCCEs, 4 eCCEs, or 8 eCCEs, but the present invention is not limited thereto. Accordingly, an aggregation level of the E-PDCCH may be 1, 2, 4, or 8, but the present invention is not limited thereto. Corresponding to different aggregation levels, quantities of E-PDCCH candidates on the aggregation levels are different. For example, for the aggregation level 1, 2, 4, or 8, the quantity of E-PDCCH candidates is 6, 6, 2, or 2 respectively.

In the following embodiments of the present invention, the E-PDCCH and a PDSCH are multiplexed in a data region of a subframe in an FDM mode; for example, the E-PDCCH and the PDSCH may occupy different RBs.

FIG. 2 is a flowchart of a method for transmitting information on an E-PDCCH according to an embodiment of the present invention. As shown in FIG. 2, the method in this embodiment includes:

Step 101: Obtain, according to a first aggregation level to which a first E-PDCCH candidate belongs, a first eCCE resource to which the first E-PDCCH candidate is mapped in a first PRB resource.

The first eCCE resource includes an eCCE for transmitting a data part corresponding to the first E-PDCCH candidate. For a same UE, eCCE resources to which E-PDCCH candidates on the first aggregation level are mapped in the first PRB resource are different from each other; for different UEs, eCCE resources to which E-PDCCH candidates on the first aggregation level are mapped in the first PRB resource may overlap. The first PRB resource includes a PRB in which an E-PDCCH candidate on each aggregation level and a PDSCH in each subframe are multiplexed. For a base station, the data part corresponding to the first E-PDCCH candidate is a data part that needs to be transmitted on the first E-PDCCH candidate.

This embodiment may be executed by the base station.

The first E-PDCCH candidate is an E-PDCCH to be transmitted. The E-PDCCH to be transmitted is an E-PDCCH on which the data part and/or a reference signal needs to be transmitted For brief description, in the embodiments of the present invention, the E-PDCCH on which the data part and/or the reference signal needs to be transmitted is referred to as the E-PDCCH to be transmitted, and transmitting the data part and/or the reference signal on the E-PDCCH is referred to as transmitting the E-PDCCH.

If the base station needs to transmit only one E-PDCCH to a UE, the E-PDCCH that needs to be transmitted is the E-PDCCH to be transmitted; if the base station needs to transmit multiple E-PDCCHs to a UE simultaneously, each E-PDCCH of the E-PDCCHs that need to be transmitted may be used as the E-PDCCH to be transmitted. The multiple E-PDCCHs that need to be transmitted may be different E-PDCCH candidates on a same aggregation level, and may also be E-PDCCH candidates on different aggregation levels.

In this embodiment, the first aggregation level may be an aggregation level 1, 2, 4 or 8, but the present invention is not limited thereto.

Optionally, the first PRB resource may be a group of PRB resources that are configured for a cell and are used for transmitting the E-PDCCH. The base station may notify each UE in the cell of the first PRB resource in advance by using broadcast signaling and the like. Thereby, each UE in the cell may learn in advance all PRB resources that are configured by the base station and are used for transmitting the E-PDCCH.

Optionally, the first PRB resource may also be a PRB resource that is configured for each UE and used for transmitting the E-PDCCH, that is, PRB resources of the E-PDCCH that different UEs need to detect may be different. The base station may transmit the first PRB resource to a corresponding UE in advance by using signaling, for example, radio resource control (Radio Resource Control, RRC) signaling. For the UE, E-PDCCH candidates in a search space of the UE may be distributed only over some PRBs in all PRB resources configured for transmitting the E-PDCCH.

In this embodiment, according to a mapping mode of the E-PDCCH, the E-PDCCH may be classified into a localized E-PDCCH and a distributed E-PDCCH. The localized E-PDCCH is mapped to one PRB or consecutive PRBs in a localized manner. In this way, the base station may select a PRB with a better channel condition for the E-PDCCH according to channel state information reported by the UE, and transmit the E-PDCCH in the selected PRB, thereby obtaining a frequency scheduling gain. The distributed E-PDCCH is mapped to multiple PRBs in a distributed manner, so that a gain of frequency diversity may be obtained. This embodiment is applicable to not only the localized E-PDCCH but also the distributed E-PDCCH. That is, the first E-PDCCH candidate in this embodiment may be the localized E-PDCCH, and may also be the distributed E-PDCCH.

To successfully transmit the first E-PDCCH candidate, firstly it is necessary to determine an eCCE resource used for transmitting the data part corresponding to the first E-PDCCH candidate, namely, the first eCCE resource. The first eCCE resource includes one or more eCCEs used for transmitting the data part corresponding to the first E-PDCCH candidate. For a same aggregation level, the UE needs to blindly detect multiple different E-PDCCH candidates. For the base station to flexibly select a most suitable PRB to transmit E-PDCCH candidates on a same aggregation level, the E-PDCCH candidates may be mapped to eCCEs in different frequency positions in a distributed manner. Channel conditions in the different frequency positions are different. In addition, a larger frequency spacing indicates stronger independence between subcarriers, and it is easier to ensure that a link performance requirement of the E-PDCCH can be satisfied in at least one E-PDCCH candidate position. Based on this, different E-PDCCH candidates on a same aggregation level are mapped to different eCCEs in this embodiment, thereby achieving a purpose of increasing the frequency spacing between the eCCEs to which the E-PDCCH candidates are mapped.

Because quantities of E-PDCCH candidates on different aggregation levels are different, different mapping results are obtained after mapping is performed according to a requirement that different E-PDCCH candidates on a same aggregation level should be mapped to different eCCEs.

In this embodiment, search spaces of different UEs may not overlap, or not completely overlap, thereby reducing a problem of blocking the E-PDCCH between UEs. The search space is a set of eCCEs to which E-PDCCH candidates on all aggregation levels are mapped, namely, the first PRB resource.

In addition, for a same UE, E-PDCCH candidates thereof on different aggregation levels may also be mapped to different eCCEs, so as to further alleviate the problem of blocking the E-PDCCH candidates between UEs.

Step 102: Determine a first DMRS port corresponding to a reference signal corresponding to the first E-PDCCH candidate.

To successfully solve a transmission problem of the first E-PDCCH candidate, it is necessary to obtain not only the first eCCE resource to which the first E-PDCCH candidate is mapped in the first PRB resource, but also a DMRS port used for transmitting the reference signal corresponding to the first E-PDCCH candidate, namely, the first DMRS port. For the base station, the reference signal corresponding to the first E-PDCCH candidate is a reference signal that needs to be transmitted on the first E-PDCCH candidate.

For the distributed E-PDCCH, its reference signal is shared by multiple UEs, and E-PDCCH candidates of different UEs are separated by a start eCCE in mapped eCCE resources. Therefore, for the distributed E-PDCCH, the base station may directly use a common DMRS port as the first DMRS port used by the base station.

For the localized E-PDCCH, its reference signal is dedicated to one UE, and reference signals of E-PDCCHs of different UEs may be different. Therefore, for the localized E-PDCCH, an obtained DMRS port used by the localized E-PDCCH is for different UEs. Based on this, the first DMRS port, which is determined in this embodiment and corresponding to the reference signal corresponding to the first E-PDCCH candidate, may be different for different UEs.

For the localized E-PDCCH, the base station may determine the first DMRS port in various manners, which are not elaborated on herein.

Step 103: Respectively transmit, on a subcarrier corresponding to the first DMRS port and the first eCCE resource, the reference signal and the data part corresponding to the first E-PDCCH candidate.

After the first DMRS port corresponding to the reference signal corresponding to the first E-PDCCH candidate and the first eCCE resource to which the data part corresponding to the first E-PDCCH candidate is mapped in the first PRB resource are determined, transmission of the first E-PDCCH candidate may be completed on the subcarrier corresponding to the first DMRS port and the first eCCE resource. Specifically, the reference signal corresponding to the first E-PDCCH candidate is transmitted on the subcarrier corresponding to the first DMRS port, and the data part corresponding to the first E-PDCCH candidate is transmitted in the first eCCE resource.

In this embodiment, an E-PDCCH to be transmitted is mapped, according to an aggregation level of the E-PDCCH to be transmitted, to an eCCE in a PRB resource that is used for transmitting the E-PDCCH, a DMRS port occupied for transmitting a reference signal of the E-PDCCH to be transmitted is determined, and then the E-PDCCH to be transmitted is transmitted on a subcarrier corresponding to the determined DMRS port and the mapped eCCE resource, thereby solving the transmission problem of the E-PDCCH.

Optionally, the first PRB resource may include multiple PRB groups, and each PRB group includes multiple consecutive PRBs in the first PRB resource.

Then an optional implementation manner of step 101 includes: determining a first PRB group to which the first E-PDCCH candidate is mapped, where the first PRB group is one of the multiple PRB groups; determining, according to a rule for cyclically using eCCEs or CCEs in the first PRB group and according to the first aggregation level, a logical number of an eCCE or a CCE occupied by the first E-PDCCH candidate in the first PRB group; and using the eCCE or CCE corresponding to the determined logical number as the first eCCE or CCE resource.

Optionally, a quantity of PRB groups included in the first PRB resource, and positions of consecutive PRBs and a quantity of consecutive PRBs included in each PRB group may be preset in a correspondence table.

Optionally, the quantity of PRB groups included in the first PRB resource, and the positions of consecutive PRBs and the quantity of consecutive PRBs included in each PRB group may also be determined by the base station in the process of transmitting the first E-PDCCH candidate.

Figure 3A:
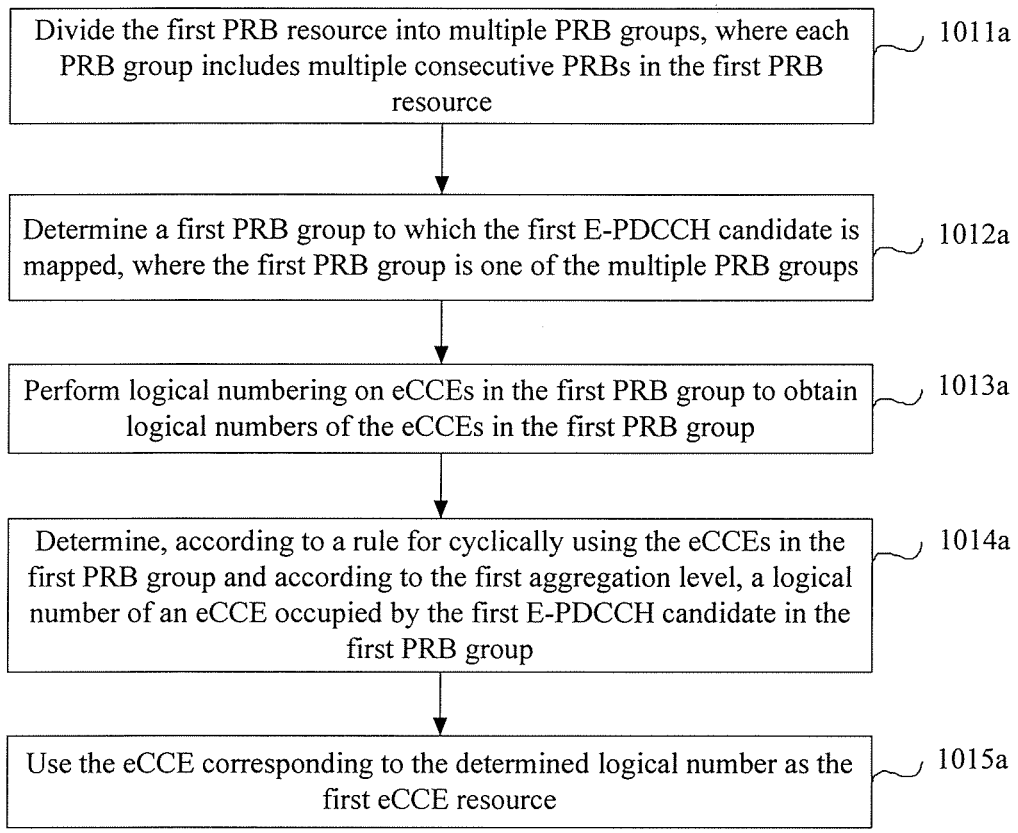
FIG. 3A is a flowchart of an implementation manner of step 101 according to an embodiment of the present invention.

Based on the implementation manner in which the base station determines the quantity of PRB groups included in the first PRB resource, and the positions of consecutive PRBs and the quantity of consecutive PRBs included in each PRB group in the process of transmitting the first E-PDCCH candidate, another optional implementation manner of step 101 is shown in FIG. 3A, and this implementation manner includes:

Step 1011a: Divide the first PRB resource into multiple PRB groups, where each PRB group includes multiple consecutive PRBs in the first PRB resource.

Step 1012a: Determine a first PRB group to which the first E-PDCCH candidate is mapped, where the first PRB group is one of the multiple PRB groups.

This implementation manner is applicable to the localized E-PDCCH. That is, in this implementation manner, the first E-PDCCH candidate is the localized E-PDCCH.

Optionally, the base station may select, based on a channel quality report of the UE, an optimal PRB to transmit the E-PDCCH.

The UE reports channel quality using a granularity of a subband (subband), where each subband includes multiple consecutive PRBs. For a same aggregation level, E-PDCCH candidates on the same aggregation level are mapped to as many subbands as possible in a distributed manner, and quantities of E-PDCCH candidates mapped to the subbands are made as equal as possible. Alternatively, because resource allocation may use a resource block group (Resource Block Group, RBG) as a granularity, the resource block group is a PRB group. One RBG includes multiple consecutive PRBs, and a bandwidth of a subband is an integral multiple of that of the RBG. Therefore, the method for mapping the E-PDCCH based on the subband may also be expressed as follows: For a same aggregation level, E-PDCCH candidates on the same aggregation level are mapped to as many RBGs as possible in a distributed manner, and quantities of E-PDCCH candidates mapped to the RBGs are made as equal as possible.

Based on the foregoing description, the base station firstly divides the first PRB resource into multiple PRB groups, where each PRB group includes multiple consecutive PRBs in the first PRB resource. Then the base station determines, according to a principle of mapping the E-PDCCH candidates on the first aggregation level to as many RBGs as possible, the first PRB group to which the first E-PDCCH candidate is mapped. The first PRB group is one of the multiple PRB groups that are obtained by means of division.

Preferably, for the localized E-PDCCH, the PRB groups to which the E-PDCCH candidates are mapped may be as consecutive as possible. Therefore, for the first E-PDCCH candidate, that the first PRB group and a PRB group to which other E-PDCCH candidates on the first aggregation level are mapped are consecutive is a preferred solution, but the present invention is not limited thereto.

The foregoing PRB group may be a subband based on which the UE reports channel state information (channel state information, CSI), may also be an RBG, and may further be a group of PRBs supporting channel estimation and interpolation in PDSCH transmission. Particularly, 1 PRB may also be used as a PRB group.

An example is used for description. It is assumed that a quantity of PRB groups obtained by means of division in the first PRB resource and used for transmitting the E-PDCCH is S, which is configured by the base station, and assume that for an aggregation level, a quantity of E-PDCCH candidates that need to be blindly detected is M. When M<=S, the M E-PDCCH candidates may be respectively mapped to M consecutive PRB groups; when M>S, each PRB group includes at least one E-PDCCH candidate, and quantities of E-PDCCH candidates included in the PRB groups are equal or differ by one E-PDCCH candidate, that is, the quantity of E-PDCCH candidates mapped to each PRB group is $\lfloor M/S \rfloor$ or $\lceil M/S \rceil$.

For example, for an aggregation level, the UE needs to detect 6 E-PDCCH candidates, and each E-PDCCH candidate is mapped to one PRB group for transmission. If the quantity of PRB groups obtained by means of division in the first PRB resource is 6, preferably, for the aggregation level, the 6 E-PDCCH candidates are respectively mapped to the 6 PRB groups, that is, one E-PDCCH candidate is mapped to each PRB group.

Optionally, the base station may determine the first PRB group according to formula (1).

$$j = (m+\sigma) \bmod S \qquad (1)$$

j is an index of the first PRB group. m is an index of the first E-PDCCH candidate, where m=0, 1, 2, ..., M. σ is an index offset value pre-allocated to a UE corresponding to the first E-PDCCH candidate, and a value thereof may be determined according to an identity of the UE and the first aggregation level; that is, σ is an offset value related to the identity of the UE and the aggregation level, and the offset value may ensure that E-PDCCH candidates of different UEs or on different aggregation levels are mapped to different positions in the first PRB group. S is a quantity of PRB groups in the first PRB resource; M is a quantity of E-PDCCH candidates on the first aggregation level; mod is a modulo operator.

Further, because a larger frequency spacing indicates less relevance between PRB groups, the frequency spacing between PRB groups to which E-PDCCH candidates are mapped may be maximized as much as possible, which may further improve performance of frequency selection scheduling. Based on this, the base station may further obtain the first PRB group according to formula (2).

$$j = \left\lfloor (m+\sigma) \cdot \frac{S}{M} \right\rfloor \bmod S \qquad (2)$$

For the description of parameters in formula (2), reference may be made to the description of the parameters in formula (1), which is not described herein again.

Step 1013a: Perform logical numbering on eCCEs in the first PRB group to obtain logical numbers of the eCCEs in the first PRB group.

Step 1014a: Determine, according to a rule for cyclically using the eCCEs in the first PRB group and according to the first aggregation level, a logical number of an eCCE occupied by the first E-PDCCH candidate in the first PRB group.

Step 1015a: Use the eCCE corresponding to the determined logical number as the first eCCE resource.

The foregoing step 1011a and step 1012a provide, based on the PRB group (subband, RBG, or on the like), the mapping of E-PDCCH candidates on each aggregation level to the PRB group. In the first PRB resource configured by the base station and used for transmitting the E-PDCCH, mapping positions of the E-PDCCH candidates on each aggregation level may also be defined using a granularity of an eCCE.

Based on this, after the first PRB group to which the first E-PDCCH candidate is mapped is obtained by calculation, it is necessary to further calculate the mapping position of the first E-PDCCH candidate in the first PRB group based on the granularity of an eCCE.

Assuming that a quantity of multiple PRBs included in the first PRB group is $N_{PRB}$, and that a quantity of eCCEs in each PRB is K, a total quantity of eCCEs in the first PRB group is $N_{CCE}=K \cdot N_{PRB}$. Calculating the mapping position of the first E-PDCCH candidate in the first PRB group based on the granularity of an eCCE means calculating a quantity and positions of eCCEs occupied by the first E-PDCCH candidate in $N_{CCE}=K \cdot N_{PRB}$ eCCEs.

Specifically, the base station performs logical numbering on the eCCEs in the first PRB group to obtain the logical numbers of the eCCEs in the first PRB group, then determines, according to the rule for cyclically using the eCCEs in the first PRB group and according to the first aggregation level, the logical number of the eCCE occupied by the first E-PDCCH candidate in the first PRB group, and then uses the eCCE corresponding to the logical number of the eCCE occupied by the first E-PDCCH candidate in the first PRB group, as the first eCCE resource.

If logical numbering is performed on the eCCEs in the first PRB group in different manners, obtained logical numbers of a same eCCE in the first PRB group are different, and finally obtained first eCCE resources are also different.

Optionally, an implementation manner of step 1103a, namely, the manner of performing logical numbering on the eCCEs in the first PRB group, may be: performing consecutive numbering on eCCEs in all PRBs in the first PRB group in ascending order of indexes of the PRBs in the first PRB group, to obtain logical numbers of the eCCEs in the first PRB group. The indexes of the PRBs are sequence numbers of the PRBs in the first PRB group. Consecutive numbering may be performed in descending order in addition to the ascending order. This implementation manner is mainly a manner of performing joint numbering on eCCEs in multiple PRBs in the first PRB group. This manner is especially applicable to a case in which a joint channel estimation gain between the multiple PRBs is not considered in a localized E-PDCCH mode. An example is used for description. It is assumed that the first PRB group includes four PRBs whose indexes are 0, 1, 2, and 3, where multiple UEs may share the first PRB group, and assume that each PRB includes 4 eCCEs, and the present invention is not limited thereto. A result of consecutive numbering in ascending order of indexes of the PRBs is: the 4 eCCEs in the first PRB are numbered eCCE0, eCCE1, eCCE2, and eCCE3; the 4 eCCEs in the second PRB are numbered eCCE4, eCCE5, eCCE6, and eCCE7; the 4 eCCEs in the third PRB are numbered eCCE8, eCCE9, eCCE10, and eCCE11; the 4 eCCEs in the fourth PRB are numbered eCCE12, eCCE13, eCCE14, and eCCE15. As can be seen, the logical numbers 0-15 of the eCCEs in the first PRB group are finally obtained by performing consecutive numbering on the eCCEs in each PRB according to the sequence of PRBs.

Based on the logical number of each eCCE in the first PRB group, the implementation process of step 1014*a* is described by using an example. Herein it is assumed that 3 UEs share the first PRB group. For a case in which more UEs share the first PRB group, reference may be made to the following process. The 3 UEs are marked as UE0, UE1, and UE2, and it is assumed that there are 4 aggregation levels in total: 1, 2, 4, and 8. Specifically, for the UE0, logical numbers of eCCEs corresponding to 6 E-PDCCHs of the UE0 on the aggregation level 1 are 0, 1, 2, 3, 4, and 5; for the UE1, logical numbers of eCCEs corresponding to 6 E-PDCCHs of the UE1 on the aggregation level 1 are 6, 7, 8, 9, 10, and 11; for the UE2, logical numbers of eCCEs corresponding to 6 E-PDCCHs of the UE2 on the aggregation level 1 are 12, 13, 14, 15, 0, and 1. As can be seen, the E-PDCCH candidates of the 3 UEs on the aggregation level 1 cyclically use the 16 eCCEs in the first PRB group.

Likewise, for the UE0, logical numbers of eCCEs corresponding to 6 E-PDCCHs of the UE0 on the aggregation level 2 are 0 and 1, 2 and 3, 4 and 5, 6 and 7, 8 and 9, and 10 and 11; for the UE1, logical numbers of eCCEs corresponding to 6 E-PDCCHs of the UE1 on the aggregation level 2 are 12 and 13, 14 and 15, 0 and 1, 2 and 3, 4 and 5, and 6 and 7; for the UE2, logical numbers of eCCEs corresponding to 6 E-PDCCHs of the UE2 on the aggregation level 2 are 8 and 9, 10 and 11, 12 and 13, 14 and 15, 0 and 1, and 2 and 3. As can be seen, the E-PDCCH candidates of the 3 UEs on the aggregation level 2 also cyclically use the 16 eCCEs in the first PRB group.

Likewise, for the UE0, logical numbers of eCCEs corresponding to 2 E-PDCCHs of the UE0 on the aggregation level 4 are 0, 1, 2, and 3, and 4, 5, 6, and 7; for the UE1, logical numbers of eCCEs corresponding to 2 E-PDCCHs of the UE1 on the aggregation level 4 are 8, 9, 10, and 11, and 12, 13, 14, and 15; for the UE2, logical numbers of eCCEs corresponding to 2 E-PDCCHs of the UE2 on the aggregation level 4 are 0, 1, 2, and 3, and 4, 5, 6, and 7. As can be seen, the E-PDCCH candidates of the 3 UEs on the aggregation level 4 also cyclically use the 16 eCCEs in the first PRB group.

However, for E-PDCCH candidates on the aggregation level 8, because only 4 PRB resources are available in the first PRB group, search spaces of the 3 UEs completely overlap. Generally, there is a low possibility that an E-PDCCH candidate on the aggregation level 8 is scheduled. Even it is possible that the E-PDCCH candidate on the aggregation level 8 may never be scheduled because an E-PDCCH is always scheduled in a PRB pair with a better channel condition. Therefore, when the E-PDCCH candidates on the aggregation level 8 are mapped to eCCE resources that mutually overlap, there is no great impact on system performance.

It should be noted that this embodiment is described by using an example in which eCCEs in the first PRB group are cyclically used when multiple UEs share the first PRB group, but the embodiment is not limited thereto. For one UE, the eCCEs in the first PRB group are also cyclically used.

Figure 3B:
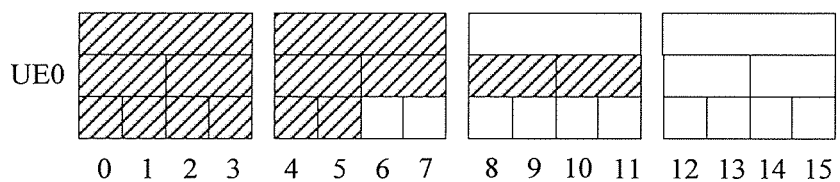
FIG. 3B to FIG. 3D are schematic diagrams of mapping results of UEs in a first PRB group according to an embodiment of the present invention.
Figure 3C:
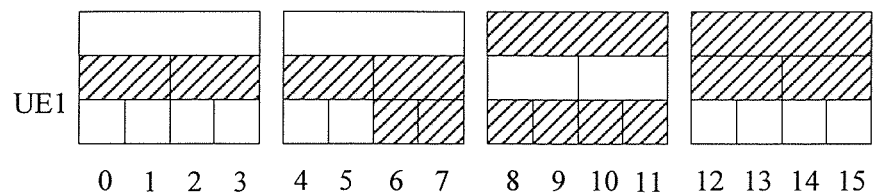
Figure 3D:
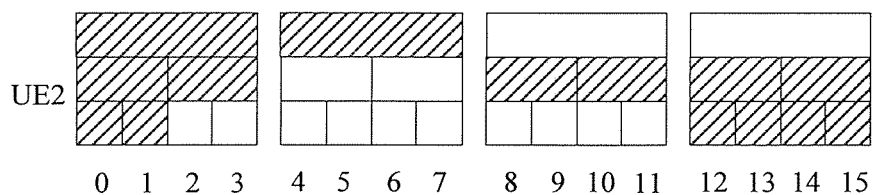
Figure 4A:
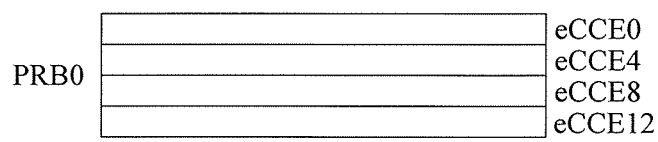
FIG. 4A to FIG. 4D are schematic diagrams of 4 PRBs in a first PRB group according to an embodiment of the present invention.
Figure 4B:
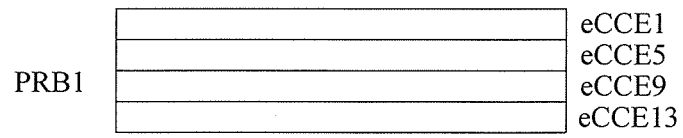
Figure 4C:
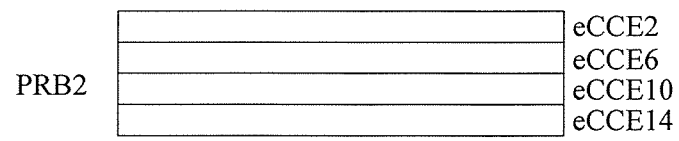
Figure 4D:
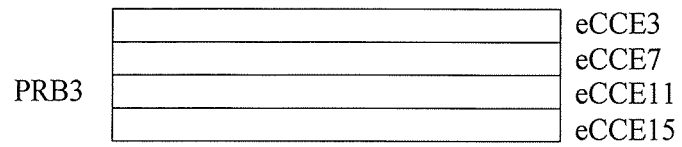

Based on the foregoing description, by using a method similar to that in release 8/9/10, that is, using a conventional tree structure, mapping results of the UE0, UE1, and UE2 in the first PRB group are shown in FIG. 3B, FIG. 3C, and FIG. 3D respectively. FIG. 3B to FIG. 3D show only mapping results when the aggregation levels are 1, 2, and 4. FIG. 3B to FIG. 3D show, from bottom to top in sequence, the mapping results when the aggregation levels are 1, 2, and 4 respectively, a shadow indicates a mapped eCCE, and a corresponding number below is a logical number of the mapped eCCE.

Optionally, the base station may determine, according to formula (3), the logical number of the eCCE occupied by the first E-PDCCH candidate in the first PRB group.

$$P_{num} = \{L \cdot m + (k \cdot L \cdot M) \bmod (K \cdot N_{PRB}) + i\} \bmod (K \cdot N_{PRB}) \qquad (3)$$

$P_{num}$ is the logical number of the eCCE occupied by the first E-PDCCH candidate in the first PRB group. k is an index of the UE corresponding to the first E-PDCCH candidate. L is a quantity of aggregation levels; i is the first aggregation level, where i=0, 1, 2, . . . , L. M is the quantity of E-PDCCH candidates on the first aggregation level. m is the index of the first E-PDCCH candidate, where m=0, 1, 2, . . . , M. $N_{PRB}$ is a quantity of PRBs in the first PRB group. K is a quantity of eCCEs in each PRB. mod is the modulo operator.

Use of the foregoing formula (3) is a preferred implementation manner to achieve a purpose of cyclically using the eCCEs in the first PRB group.

After the logical numbers of eCCEs occupied by the first E-PDCCH candidate in the first PRB group are obtained, the eCCEs corresponding to the logical numbers are the first eCCE resource required for transmitting the data part corresponding to the first E-PDCCH candidate.

It should be noted that, as can be known from the foregoing example, E-PDCCH candidates of each UE on different aggregation levels may be mapped to different PRBs in a distributed manner. Therefore, to improve data demodulation performance of the E-PDCCH, channel estimation and interpolation between the different PRBs may be used to improve channel estimation accuracy of each PRB. For example, for the UE0, because its E-PDCCH candidates are mainly distributed to the first 3 PRBs, it can be considered that channel estimation and interpolation between the 3 PRBs are used to improve data demodulation performance of the E-PDCCH of the UE0. For the UE1 and UE2, because their E-PDCCH candidates are mainly distributed to all the 4 PRB pairs, joint channel estimation and interpolation of the 4 PRB pairs may be considered so that data demodulation performance of the E-PDCCH candidates of the UE1 and UE2 can be improved.

E-PDCCH candidates of each UE on different aggregation levels are mapped to different PRBs in a distributed manner if possible, which may not only improve channel estimation and interpolation performance of the E-PDCCH, but also obtain a maximum frequency diversity gain provided by a system, and therefore helps improve the overall performance of the E-PDCCH. To map the E-PDCCH candidates of the UE on different aggregation levels to different PRBs in a distributed manner, this embodiment provides another optional implementation manner of step 1103a, namely, another manner of performing logical numbering on the eCCEs or CCEs in the first PRB group. This implementation manner may be: performing consecutive numbering on the eCCEs in all physical positions in the first PRB group in ascending order of indexes of the physical positions of the eCCEs in the respective PRBs in the first PRB group, to obtain the logical numbers of the eCCEs in the first PRB group. Herein the physical positions of the eCCEs in the respective PRBs mainly refer to frequency positions of the eCCEs in the respective PRBs. Consecutive numbering may be performed in descending order in addition to the ascending order. This implementation manner is mainly to perform logical numbering on the eCCEs in the first PRB group in ascending or descending order of indexes of the physical positions of the eCCEs in the respective PRBs. For multiple eCCEs whose physical positions have a same index, consecutive numbering may be performed in a preset order, where the preset order may be an ascending or descending order of indexes of the PRBs. An example is used for description. It is assumed that the first PRB group includes 4 PRBs, and each PRB includes 4 eCCEs. The 4 PRBs are marked as PRB0, PRB1, PRB2, and PRB3. FIG. 4A to FIG. 4D show the 4 eCCEs in each of the 4 PRBs, which are a first eCCE, a second eCCE, a third eCCE, and a fourth eCCE from top to bottom in sequence, and the corresponding indexes are 0, 1, 2, and 3 respectively. It is assumed that: physical positions of the first eCCEs in the 4 PRBs are the same, physical positions of the second eCCEs in the 4 PRBs are the same, physical positions of the third eCCEs in the 4 PRBs are the same, physical positions of the fourth eCCEs in the 4 PRBs are also the same, and indexes of the same physical positions in the PRBs are also the same.

Then consecutive numbering is performed on the eCCEs in all the physical position in ascending order of indexes of the physical positions of the eCCEs in the respective PRBs, for example, in order of an index of the physical position of the first eCCE, an index of the physical position of the second eCCE, an index of the physical position of the third eCCE, and an index of the physical position of the fourth eCCE. Numbering results are: numbers of the eCCEs in the PRB0 are eCCE0, eCCE4, eCCE8, and eCCE12; numbers of the eCCEs in the PRB1 are eCCE1, eCCE5, eCCE9, and eCCE13; numbers of the eCCEs in the PRB2 are eCCE2, eCCE6, eCCE10, and eCCE14; numbers of the eCCEs in the PRB3 are eCCE3, eCCE7, eCCE11, and eCCE15. In the foregoing numbering manner, eCCEs in a same physical position are numbered in ascending order of indexes of the PRBs. The numbering results are shown on a right side of each eCCE in FIG. 4A to FIG. 4D. As can be seen, the logical numbers 0-15 of the eCCEs in the first PRB group are finally obtained by performing consecutive numbering on the eCCEs in all the physical positions in an order of the physical positions of the eCCEs.

Based on the logical number of each eCCE in the first PRB group, the implementation process of step 1014a is described by using an example. Herein it is assumed that 3 UEs share the first PRB group. For a case in which more UEs share the first PRB group, reference may be made to the following process. The 3 UEs are marked as UE0, UE1, and UE2, and it is assumed that there are 4 aggregation levels in total: 1, 2, 4, and 8. Specifically, for the UE0, logical numbers of eCCEs corresponding to 6 E-PDCCHs of the UE0 on the aggregation level 1 are 0, 1, 2, 3, 4, and 5; for the UE1, logical numbers of eCCEs corresponding to 6 E-PDCCHs of the UE1 on the aggregation level 1 are 6, 7, 8, 9, 10, and 11; for the UE2, logical numbers of eCCEs corresponding to 6 E-PDCCHs of the UE2 on the aggregation level 1 are 12, 13, 14, 15, 0, and 1. As can be seen, the E-PDCCH candidates of the 3 UEs on the aggregation level 1 cyclically use the 16 eCCEs in the first PRB group.

Likewise, for the UE0, logical numbers of eCCEs corresponding to 6 E-PDCCHs of the UE0 on the aggregation level 2 are 0 and 1, 2 and 3, 4 and 5, 6 and 7, 8 and 9, and 10 and 11; for the UE1, logical numbers of eCCEs corresponding to 6 E-PDCCHs of the UE1 on the aggregation level 2 are 12 and 13, 14 and 15, 0 and 1, 2 and 3, 4 and 5, and 6 and 7; for the UE2, logical numbers of eCCEs corresponding to 6 E-PDCCHs of the UE2 on the aggregation level 2 are 8 and 9, 10 and 11, 12 and 13, 14 and 15, 0 and 1, and 2 and 3. As can be seen, the E-PDCCH candidates of the 3 UEs on the aggregation level 2 cyclically use the 16 eCCEs in the first PRB group.

For the UE0, logical numbers of eCCEs corresponding to 2 E-PDCCHs of the UE0 on the aggregation level 4 are 0, 1, 2, and 3, and 4, 5, 6, and 7; for the UE1, logical numbers of eCCEs corresponding to 2 E-PDCCHs of the UE1 on the aggregation level 4 are 8, 9, 10, and 11, and 12, 13, 14, and 15; for the UE2, logical numbers of eCCEs corresponding to 2 E-PDCCHs of the UE2 on the aggregation level 4 are 0, 1, 2, and 3, and 4, 5, 6, and 7. As can be seen, the E-PDCCH candidates of the 3 UEs on the aggregation level 4 cyclically use the 16 eCCEs in the first PRB group.

However, for E-PDCCH candidates on the aggregation level 8, because only 4 PRB resources are available in the first PRB group, search spaces of the 3 UEs completely overlap. Generally, there is a low possibility that an E-PDCCH candidate on the aggregation level 8 is scheduled. Even it is possible that the E-PDCCH candidate on the aggregation level 8 may never be scheduled because an E-PDCCH is always scheduled in a PRB pair with a better channel condition. Therefore, when the E-PDCCH candidates on the aggregation level 8 are mapped to eCCE resources that mutually overlap, there is no great impact on system performance.

It should be noted that this embodiment is described by using an example in which eCCEs in the first PRB group are cyclically used when multiple UEs share the first PRB group, but the embodiment is not limited thereto. For one UE, the eCCEs in the first PRB group are also cyclically used.

Figure 5A:
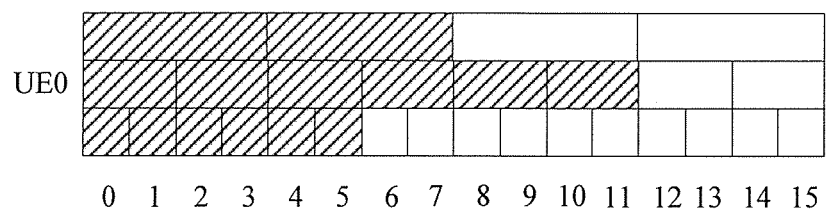
FIG. 5A to FIG. 5C are schematic diagrams of mapping results of UEs in a first PRB group according to another embodiment of the present invention.
Figure 5B:
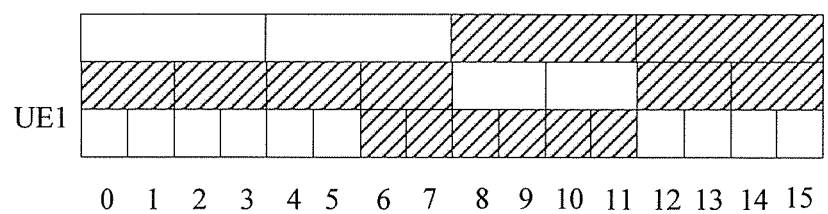
Figure 5C:
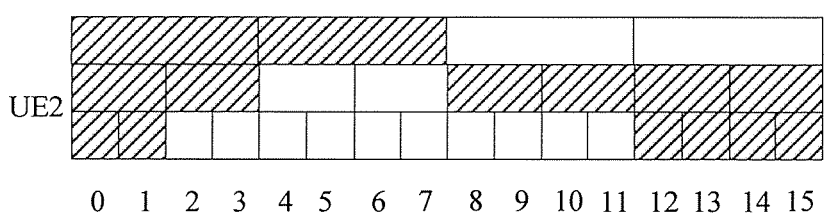

Based on the foregoing description, by using the method similar to that in release 8/9/10, that is, using the conventional tree structure, mapping results of the UE0, UE1, and UE2 in the first PRB group are shown in FIG. 5A, FIG. 5B, and FIG. 5C respectively. FIG. 5A to FIG. 5C show only mapping results when the aggregation levels are 1, 2, and 4. FIG. 5A to FIG. 5C show, from bottom to top in sequence, the mapping results when the aggregation levels are 1, 2, and 4 respectively, a shadow indicates a mapped eCCE, and a corresponding number below is a logical number of the mapped eCCE.

As can be seen from FIG. 4A to FIG. 4D, and FIG. 5A to FIG. 5C, E-PDCCH candidates of a same UE on a same aggregation level are mapped to multiple PRBs, which helps improve transmission performance of the E-PDCCH.

Optionally, the base station may also determine, according to formula (3), the logical number of the eCCE occupied by the first E-PDCCH candidate in the first PRB group. For the description of formula (3) and parameters thereof, reference may be made to the foregoing description.

Optionally, the first PRB resource includes multiple PRB clusters, and each PRB cluster includes multiple consecutive or non-consecutive PRBs in the first PRB resource.

Then another optional implementation manner of step 101 includes: determining, according to a rule for cyclically using eCCEs in the first PRB resource and according to the first aggregation level, a logical number of an eCCE or a CCE occupied by the first E-PDCCH candidate in the first PRB resource; and then using the eCCE or CCE corresponding to the determined logical number as the first eCCE or CCE resource. Logical numbering performed on the eCCEs in the first PRB resource is used to map the first E-PDCCH candidate and other E-PDCCH candidates on the first aggregation level to at least two PRB clusters.

Optionally, a quantity of PRB clusters included in the first PRB resource, positions of PRBs and a quantity of PRBs included in each PRB cluster may be preset in a correspondence table.

Optionally, a quantity of PRB clusters included in the first PRB resource, positions of PRBs and a quantity of PRBs included in each PRB cluster may also be determined by the base station in the process of transmitting the first E-PDCCH candidate.

Figure 6:
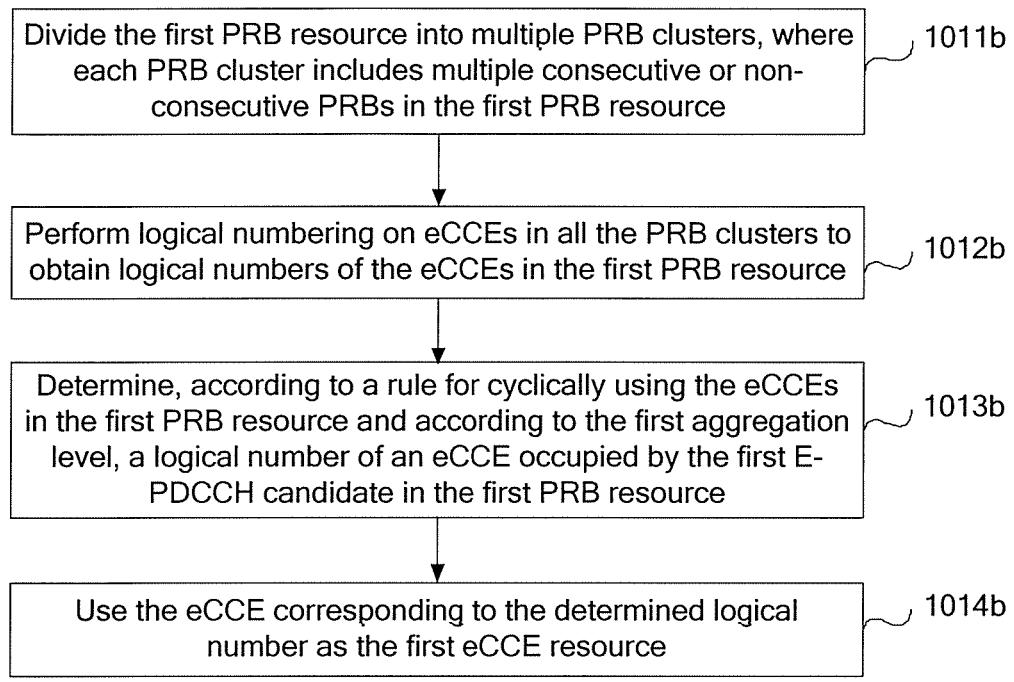
FIG. 6 is a flowchart of an implementation manner of step 101 according to another embodiment of the present invention.

Based on the implementation manner in which the base station determines the quantity of PRB clusters included in the first PRB resource, the positions of PRBs and quantity of PRBs included in each PRB cluster in the process of transmitting the first E-PDCCH candidate, another implementation manner of step 101 is shown in FIG. 6, and this implementation manner includes:

Step 1011b: Divide the first PRB resource into multiple PRB clusters, where each PRB cluster includes multiple consecutive or non-consecutive PRBs in the first PRB resource.

Step 1012b: Perform logical numbering on eCCEs in all the PRB clusters to obtain logical numbers of the eCCEs in the first PRB resource.

Step 1013b: Determine, according to a rule for cyclically using the eCCEs in the first PRB resource and according to the first aggregation level, a logical number of an eCCE occupied by the first E-PDCCH candidate in the first PRB resource.

Step 1014b: Use the eCCE corresponding to the determined logical number as the first eCCE resource.

This implementation manner is applicable to the distributed E-PDCCH. That is, in this embodiment, the first E-PDCCH candidate is the distributed E-PDCCH.

For the distributed E-PDCCH, E-PDCCH candidates of the UE on different aggregation levels should be distributed to as many PRBs as possible, so as to obtain a greater frequency diversity gain. To achieve this purpose, in this implementation manner, the base station divides the first PRB resource used for transmitting the E-PDCCH into multiple PRB clusters, where each PRB cluster includes multiple consecutive or non-consecutive PRBs in the first PRB resource. That each PRB cluster includes multiple non-consecutive PRBs in the first PRB resource is a preferred implementation manner. A quantity of PRB clusters obtained by means of division may be determined according to a coherence bandwidth of a channel. If the coherence bandwidth of the channel is q PRBs, the quantity of PRB clusters obtained by means of division is R=Q/q, where Q is a total quantity of PRBs in the first PRB resource.

Then, the base station performs logical numbering on the eCCEs in all PRB clusters to obtain the logical numbers of the eCCEs in the first PRB resource. A manner of performing logical numbering on the eCCEs in all PRB clusters by the base station is not limited. Any numbering manner may be used as long as it cooperates with the manner of cyclically using the eCCEs in the first PRB resource and enables the first E-PDCCH candidate to be distributed to more PRBs. For an aggregation level, the numbering manner in this embodiment enables different E-PDCCH candidates to be mapped to as many PRBs as possible in a distributed manner. In this embodiment, a purpose of performing logical numbering on the eCCEs in the first PRB resource is to map the first E-PDCCH candidate and the other E-PDCCH candidates on the first aggregation level to at least two PRB clusters. In other words, in this embodiment, the purpose of performing logical numbering on the eCCEs in the first PRB resource is to distribute E-PDCCH candidates on a same aggregation level to multiple different PRB clusters, so as to achieve the purpose of distributing a same E-PDCCH candidate to multiple PRBs or distributing multiple E-PDCCH candidates on a same aggregation level to multiple PRBs.

Figure 7:
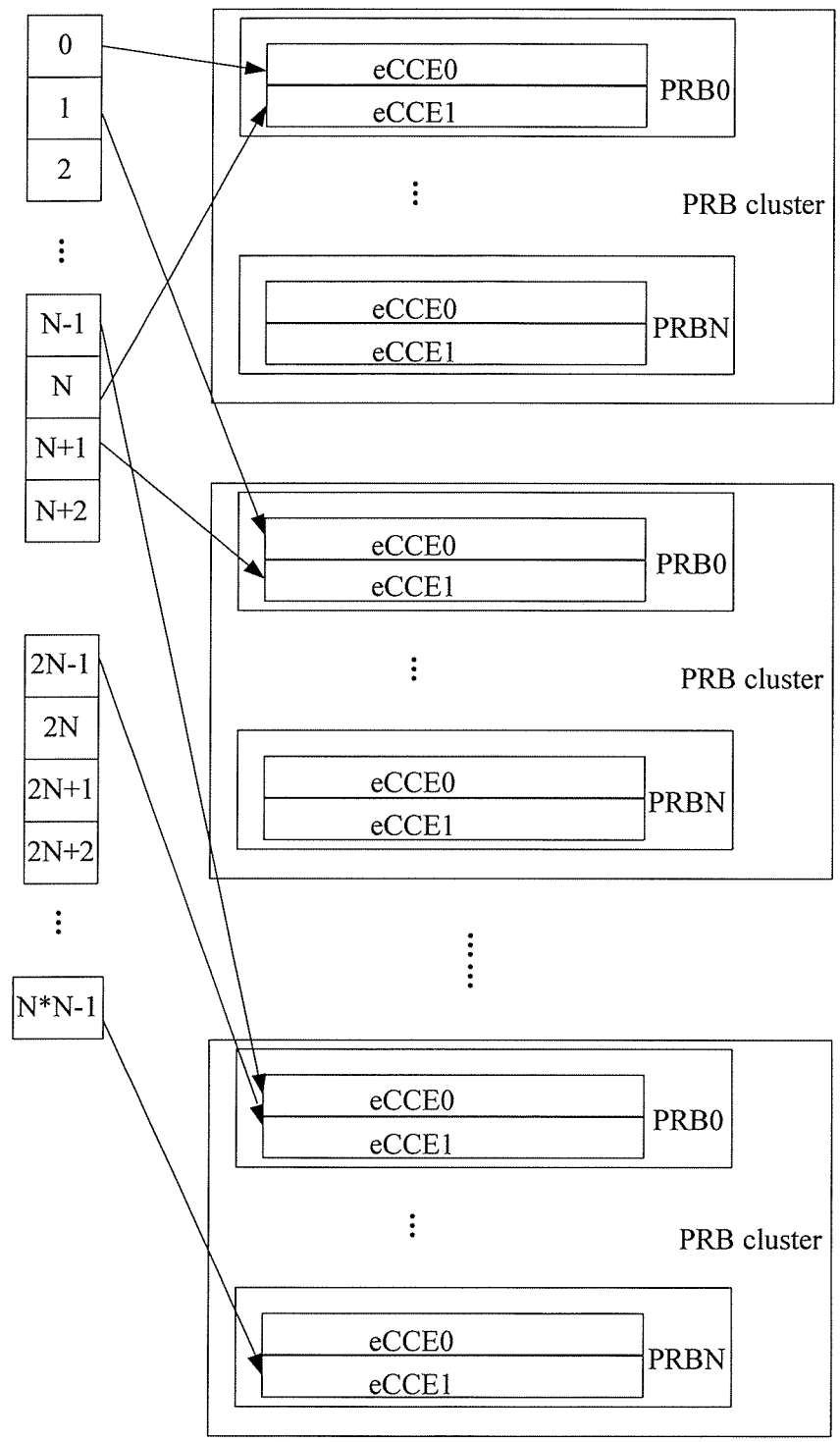
FIG. 7 is a schematic diagram of a numbering result according to an embodiment of the present invention.

Optionally, an implementation manner of step 1012b, namely, the manner of performing logical numbering on the eCCEs or CCEs in the first PRB resource, may be: consecutively sorting the PRBs in all the PRB clusters in ascending order of indexes of the PRBs in the PRB clusters; and then performing consecutive numbering on eCCEs in all the sorted PRBs in ascending order of indexes of physical positions of the eCCEs in the respective PRBs among the sorted PRBs, to obtain logical numbers of the eCCEs in the first PRB resource. Specifically, the numbering manner is: numbering a first eCCE in a first PRB in each PRB cluster in order, and then continuing to number a second eCCE and so on until the first PRB in each PRB cluster is numbered; and then continuing to number a first eCCE in the second PRB in each cluster and so on until each eCCE in the first PRB resource is numbered. A numbering result in this implementation manner is shown in FIG. 7. Therefore, for each E-PDCCH candidate, when the E-PDCCH candidate is mapped to an eCCE in order, it can be ensured that the E-PDCCH candidate obtains a maximum frequency diversity gain, thereby improving transmission performance of the E-PDCCH.

Regardless of whether the first E-PDCCH candidate is the distributed E-PDCCH or the localized E-PDCCH, the frequency position of the first E-PDCCH candidate in the eCCE to which the E-PDCCH candidate is mapped in the first PRB resource, namely, the first eCCE resource, may be obtained by using the foregoing corresponding method. That is, regardless of the distributed E-PDCCH or the localized E-PDCCH, a frequency position in an eCCE to which each E-PDCCH candidate on each aggregation level is mapped in the PRB resource used for transmitting the E-PDCCH may be obtained by using a processing manner similar to that of the first E-PDCCH candidate. For the distributed E-PDCCH, the UE may perform channel estimation on a common E-PDCCH reference signal, and then may perform blind detection on each E-PDCCH candidate based on a channel estimation result. However, for the localized E-PDCCH, a reference signal of an E-PDCCH used in eCCE demodulation needs to be obtained in addition to an eCCE position of each E-PDCCH candidate. In addition, for an aggregation level, if multiple E-PDCCH candidates are mapped in a same PRB, but the E-PDCCH candidates share a reference signal on a same DMRS port, once the DMRS port is occupied, all the multiple E-PDCCH candidates are unavailable. Therefore, if multiple E-PDCCH candidates are mapped in a same PRB, the E-PDCCH candidates need to use reference signals on different DMRS ports, which may ensure independence of the E-PDCCH candidates in the same PRB.

According to the foregoing description, if the first E-PDCCH candidate in the embodiment of the present invention is the localized E-PDCCH, it is necessary to solve a problem of the DMRS port corresponding to the reference signal corresponding to the first E-PDCCH candidate. To solve this problem, the following embodiment of the present invention provides several optional implementation manners of step 102.

An optional implementation manner of step 102 includes: determining the first DMRS port according to the first E-PDCCH candidate and a first correspondence. The first correspondence is a correspondence between an E-PDCCH and a DMRS port. Specifically, this method is: defining a DMRS port corresponding to each E-PDCCH candidate for each aggregation level, and generating the first correspondence according to each E-PDCCH candidate and the DMRS port corresponding to the E-PDCCH candidate.

Optionally, the base station and the UE may negotiate, determine, and separately store the first correspondence in advance, that is, predetermine the first correspondence in an implicit manner.

Optionally, the base station may further notify the UE of the first correspondence by using signaling. For example, before transmitting the first E-PDCCH candidate to the UE, the base station may notify the UE of the first correspondence by using first broadcast signaling or first RRC signaling. The correspondence may be specific to a cell, that is, all UEs in the cell use the same first correspondence. In this case, the base station may notify all the UEs in the cell of the first correspondence by using the first broadcast signaling. The first correspondence may also be specific to a UE, that is, different UEs may use different first correspondences. In this case, the base station may notify the corresponding UE of the first correspondence by using the first RRC signaling.

Optionally, the first correspondence may be determined according to some parameters, for example, a cell identity, a UE identity, and/or an aggregation level.

Optionally, the first correspondence may be determined according to multiple predefined multiple DMRS ports cyclically used by each E-PDCCH candidate in sequence. For example, assuming that a quantity of multiple predefined DMRS ports is P, an optional manner of determining the first DMRS port according to the first E-PDCCH candidate and the first correspondence may be: determining the first DMRS port among multiple preset DMRS ports according to formula (4).

$$AP_{num} = (m+\sigma) \bmod P \quad (4)$$

$AP_{num}$ is a calculated index of the first DMRS port; m is the index of the first E-PDCCH candidate, where m=0, 1, 2, . . . , M, and M is the quantity of E-PDCCH candidates on the first aggregation level. P is a quantity of the multiple DMRS ports. σ is an index offset value pre-allocated to a UE corresponding to the first E-PDCCH candidate, and a value thereof may be determined according to an identity of the UE and the first aggregation level. mod is the modulo operator.

In LTE release 11, P may be 4, that is, there are 4 available DMRS ports in total.

Further, in LTE release 11, 4 DMRS ports that may be used for the reference signal of the E-PDCCH are 7-10. That is, a start value of the DMRS port is 7 but not 0. Based on this, the foregoing formula (4) may change to formula (5).

$$AP_{num} = a + (m+\sigma) \bmod P \quad (5)$$

where, a is a constant, and is used to indicate a start value of the multiple DMRS ports, and for example, in LTE release 11, a is 7.

It should be noted that start values of DMRS ports used for the reference signal of the E-PDCCH may be different in different systems. Therefore, a formula for calculating the first DMRS port in each system may be obtained by using different values of a in formula (5).

Another optional implementation manner of step 102 includes: determining the first DMRS port according to the first eCCE resource and a second correspondence. The second correspondence is a correspondence between an eCCE and a DMRS port. Specifically, this manner predefines a correspondence between each eCCE and the DMRS port.

Optionally, the base station and the UE may negotiate, determine, and separately store the second correspondence in advance, that is, predetermine the second correspondence in an implicit manner.

Optionally, the base station may further notify the UE of the second correspondence by using signaling. For example, before transmitting the first E-PDCCH candidate to the UE, the base station may notify the UE of the second correspondence by using second broadcast signaling or second RRC signaling. The second correspondence may be specific to a cell, that is, all UEs in the cell use the same second correspondence. In this case, the base station may notify all the UEs in the cell of the second correspondence by using the second broadcast signaling. The second correspondence may also be specific to a UE, that is, different UEs may use different second correspondences. In this case, the base station may notify the corresponding UE of the second correspondence by using the second RRC signaling.

Optionally, the second correspondence may be determined according to some parameters, for example, a cell identity and/or a UE identity.

Optionally, the second correspondence may be determined according to multiple predefined DMRS ports cyclically used by each eCCE in sequence. For example, assuming that a quantity of multiple predefined DMRS ports is P, an optional manner of determining the first DMRS port according to the first E-PDCCH candidate and the second correspondence may be: obtaining, according to the second correspondence, a DMRS port corresponding to one eCCE that has a smallest index in the first eCCE resource, and using the obtained DMRS port corresponding to the one eCCE that has the smallest index as the first DMRS port.

Optionally, in LTE release 11, DMRS ports that may be used for the reference signal of the E-PDCCH are 7-10, and therefore P may be 4. As multiple E-PDCCH candidates cyclically use the 4 DMRS ports, the base station may obtain, according to formula (6), a DMRS port corresponding to one eCCE that has a smallest index from multiple preconfigured DMRS ports.

$$AP_{num} = a + (x+\sigma) \bmod P \quad (6)$$

a is the constant, and is used to indicate the start value of the multiple preset DMRS ports. For example, in LTE release 11, a is 7. $AP_{num}$ is the index of the first DMRS port. x is the index of the one eCCE that has the smallest index. P is the quantity of the multiple DMRS ports. σ is the index offset value pre-allocated to the UE corresponding to the first E-PDCCH candidate, and a value thereof may be determined according to the identity of the UE and the first aggregation level. mod is the modulo operator.

It should be noted that for the aggregation level 1, the first E-PDCCH candidate is mapped only to one eCCE. Therefore, the eCCE is the eCCE that has the smallest index, and the DMRS port corresponding to the eCCE is the first DMRS port.

Further, to improve channel estimation performance, for the aggregation level 2, 4, 8, or the like, two DMRS ports corresponding to two eCCEs that have a smallest index may be used to perform channel estimation and data demodulation. In this case, another optional manner of determining the first DMRS port according to the first eCCE resource and the second correspondence may be: obtaining, according to the second correspondence, DMRS ports corresponding to two eCCEs that have a smallest index in the first eCCE resource, and using the obtained DMRS ports corresponding to the two eCCEs that have the smallest index as the first DMRS ports. In this case, the base station transmits, on the two determined DMRS ports, the reference signal corresponding to the first E-PDCCH candidate, so as to implement redundancy of the reference signal.

Optionally, in LTE release 11, the base station may also separately calculate, according to the formula (6), the DMRS port corresponding to each eCCE of the two eCCEs that have the smallest index.

Another optional implementation manner of step 102 includes: determining the first DMRS port according to a preconfigured reference DMRS port corresponding to a first PRB. The first PRB is a PRB in which the first eCCE resource is located. Specifically, this method is mainly predefining a reference DMRS port for each PRB, and then obtaining the first DMRS port according to the first eCCE resource and the reference DMRS port of the PRB in which the first eCCE resource is located. Reference DMRS ports of different PRBs may be the same, and different reference DMRS ports may also be defined for each PRB separately.

Optionally, the base station and the UE may negotiate, determine, and store the reference DMRS port of each PRB in advance, that is, predetermine the reference DMRS port of each PRB in an implicit manner.

Optionally, the base station may further notify the UE of the reference DMRS port of each PRB in the first PRB resource by using signaling. For example, before transmitting the first E-PDCCH candidate to the UE, the base station may notify the UE of the reference DMRS port of each PRB in the first PRB resource by using third broadcast signaling or third RRC signaling. The reference DMRS port of each PRB may be specific to a cell, that is, for a same PRB, all UEs in the cell use a same reference DMRS port. In this case, the base station may notify all the UEs in the cell of the reference DMRS port of each PRB by using the third broadcast signaling. The reference DMRS port of each PRB may also be specific to a UE, that is, for a same PRB, different UEs may use different reference DMRS ports. In this case, the base station may notify the corresponding UE of the reference DMRS port of each PRB in the first PRB resource by using the third RRC signaling.

Optionally, the reference DMRS port of each PRB may be determined according to some parameters, for example, a cell identity and/or a UE identity.

Optionally, the base station may determine the reference DMRS port of each PRB according to formula (7).

$$p = a + (n + \sigma) \bmod P \quad (7)$$

a is the constant, and is used to indicate the start value of multiple DMRS ports. For example, in LTE release 11, a is 7. p is an index of the reference DMRS port corresponding to the first PRB. n is an index of the first PRB, and P is the quantity of the multiple DMRS ports. σ is the index offset value pre-allocated to the UE corresponding to the first E-PDCCH candidate, and a value thereof may be determined according to the identity of the UE and the first aggregation level.

Optionally, for a same UE, reference DMRS ports of all PRBs in the first PRB resource may be the same, for example, p=σ.

Optionally, if the first E-PDCCH candidate is the only E-PDCCH that is mapped to the first PRB, the reference DMRS port of the first PRB may be used as the first DMRS port corresponding to the reference signal corresponding to the first E-PDCCH candidate.

Optionally, if other E-PDCCH candidates on the first aggregation level, in addition to the first E-PDCCH candidate, are mapped to the first PRB, the first DMRS port may be determined according to the reference DMRS port corresponding to the first PRB and a mapping sequence of the first E-PDCCH candidate in the first PRB. The mapping sequence is a sequence of mapping to the first PRB. Therefore, it may be ensured that multiple E-PDCCH candidates mapped to the first PRB use different DMRS ports, which may improve independence from each other, and help to improve data demodulation performance.

Optionally, the base station may determine the first DMRS port among multiple preset DMRS ports according to formula (8).

$$AP_{num} = a + (p - a + y1) \bmod P \quad (8)$$

a is the constant, and is used to indicate the start value of the multiple DMRS ports. For example, in LTE release 11, a is 7. $AP_{num}$ is the index of the first DMRS port. P is the quantity of the multiple DMRS ports. p is the index of the reference DMRS port corresponding to the first PRB, and may be obtained, for example, by using formula (7). y1 is a mapping sequence of the first E-PDCCH candidate in the first PRB, where y1=0, . . . , C−1; C is a total quantity of E-PDCCH candidates on the first aggregation level that are mapped to the first PRB. mod is the modulo operator.

Optionally, if other E-PDCCH candidates on the first aggregation level, in addition to the first E-PDCCH candidate, are mapped to the first PRB, the base station may further determine the first DMRS port according to the reference DMRS port corresponding to the first PRB and an index of an eCCE that has a smallest or largest index value in the first eCCE resource. Specifically, the base station may determine the first DMRS port according to formula (9).

$$AP_{num} = a + (p - a + y2) \bmod P \quad (9)$$

In formula (9), a is the constant, and is used to indicate the start value of multiple DMRS ports. For example, in LTE release 11, a is 7. y2 is the index of the eCCE that has the smallest or largest index value in the first eCCE resource. For other parameters in formula (9), reference may be made to the explanation of the same parameters in formula (8).

Optionally, when the first E-PDCCH candidate is mapped to multiple adjacent PRBs, if channel estimation and interpolation in different PRBs are supported to enhance channel estimation performance, it may be specified that the first E-PDCCH candidate mapped to multiple PRBs uniformly uses, in the multiple PRBs, the first DMRS port that is to be used and is determined according to a reference DMRS port of one PRB of the multiple PRBs, for example, determined according to a PRB that has the smallest index.

Another optional implementation manner of step 102 includes: determining the first DMRS port according to a preconfigured reference DMRS port corresponding to the first PRB group. The first PRB group is a PRB group in which the first eCCE resource is located. Specifically, the method is first predefining a reference DMRS port for each PRB group. The PRB group herein may refer to a subband, an RBG, or a group of PRBs that is reported by the UE by using CSI, where the group of PRBs supports channel estimation and interpolation in PDSCH transmission. Reference DMRS ports of different PRB groups may be the same, or different reference DMRS ports may also be defined for each PRB group separately.

Optionally, the base station and the UE may negotiate, determine, and store the reference DMRS port of each PRB group in advance, that is, determine the reference DMRS port of each PRB group in an implicit manner.

Optionally, the base station may further notify the UE of the reference DMRS port of each PRB group in the first PRB resource by using signaling. For example, before transmitting the first E-PDCCH candidate to the UE, the base station may notify the UE of the reference DMRS port of each PRB group in the first PRB resource by using third broadcast signaling or third RRC signaling. The reference DMRS port of each PRB group may be specific to a cell, that is, for a same PRB group, all UEs in the cell use a same reference DMRS port. In this case, the base station may notify all the UEs in the cell of the reference DMRS port of each PRB group by using the third broadcast signaling. The reference DMRS port of each PRB group may also be specific to a UE, that is, for a same PRB group, different UEs may use different reference DMRS ports. In this case, the base station may notify the corresponding UE of the reference DMRS port of each PRB group in the first PRB resource by using the third RRC signaling.

Optionally, the reference DMRS port of each PRB group may be determined according to some parameters, for example, a cell identity and/or a UE identity.

Optionally, the base station may determine the reference DMRS port of each PRB group according to formula (7). Herein, p in formula (7) is an index of the reference DMRS port corresponding to the first PRB group. n is an index of the first PRB group, and P is the quantity of multiple DMRS ports.

Optionally, for a same UE, reference DMRS ports of all PRB groups in the first PRB resource may be the same, for example, p=σ.

Optionally, if the first E-PDCCH candidate is the only E-PDCCH that is mapped to the first PRB group, the reference DMRS port of the first PRB group may be used as the first DMRS port corresponding to the reference signal corresponding to the first E-PDCCH candidate.

Optionally, if other E-PDCCH candidates on the first aggregation level, in addition to the first E-PDCCH candidate, are mapped to the first PRB group, the first DMRS port may be determined according to the reference DMRS port corresponding to the first PRB group and a mapping sequence of the first E-PDCCH candidate in the first PRB group. The mapping sequence is a sequence of mapping to the first PRB group. Therefore, it may be ensured that multiple E-PDCCH candidates mapped to the first PRB group use different DMRS ports, which may improve independence from each other, and help to improve data demodulation performance.

Optionally, the base station may determine the first DMRS port among multiple preconfigured DMRS ports according to formula (8). Herein, p in formula (8) is the index of the reference DMRS port corresponding to the first PRB group, and may be obtained, for example, by using formula (7). y1 is the mapping sequence of the first E-PDCCH candidate in the first PRB group, where y1=0, . . . , C−1; C is the total quantity of E-PDCCH candidates on the first aggregation level that are mapped to the first PRB group.

Optionally, if other E-PDCCH candidates on the first aggregation level, in addition to the first E-PDCCH candidate, are mapped to the first PRB group, the base station may further determine the first DMRS port according to the reference DMRS port corresponding to the first PRB group and an index of an eCCE that has a smallest or largest index value in the first eCCE resource. Specifically, the base station may determine the first DMRS port according to formula (9). It should be noted that the foregoing implementation manners of obtaining the first DMRS port are not only applicable to the localized E-PDCCH, but also applicable to the distributed E-PDCCH.

In summary, the foregoing embodiments of the present invention provide various methods for obtaining an eCCE mapping position of a first E-PDCCH candidate in a first PRB resource and methods for determining a DMRS port for transmitting a reference signal corresponding to the first E-PDCCH candidate, so that a data part and the reference signal corresponding to the first E-PDCCH candidate are respectively transmitted on an obtained eCCE resource and a subcarrier corresponding to the DMRS port, thereby solving the transmission problem of the E-PDCCH.

Figure 8:
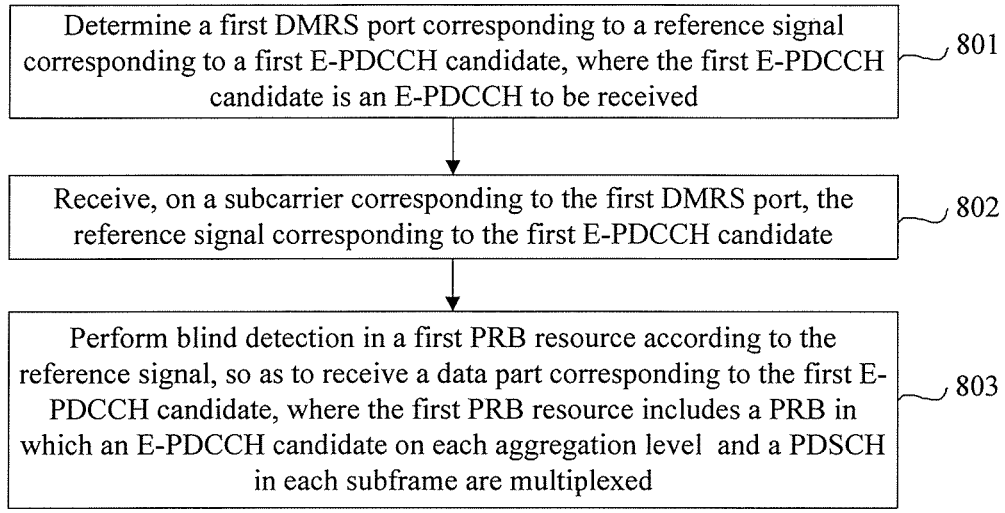
FIG. 8 is a flowchart of a method for receiving information on an E-PDCCH according to an embodiment of the present invention.

FIG. 8 is a flowchart of a method for receiving information on an E-PDCCH according to an embodiment of the present invention. As shown in FIG. 8, the receiving method in this embodiment includes:

Step 801: Determine a first DMRS port corresponding to a reference signal corresponding to a first E-PDCCH candidate, where the first E-PDCCH candidate is an E-PDCCH to be received.

Step 802: Receive, on a subcarrier corresponding to the first DMRS port, the reference signal corresponding to the first E-PDCCH candidate.

For a UE, the reference signal corresponding to the first E-PDCCH candidate is a reference signal that needs to be received on the first E-PDCCH candidate.

Step 803: Perform blind detection in a first PRB resource according to the reference signal, so as to receive a data part corresponding to the first E-PDCCH candidate, where the first PRB resource includes a PRB in which an E-PDCCH candidate on each aggregation level and a PDSCH in each subframe are multiplexed.

For the UE, the data part corresponding to the first E-PDCCH candidate is a data part that needs to be received on the first E-PDCCH candidate.

This embodiment is executed by the UE.

Specifically, a process of receiving the E-PDCCH by the UE includes the following: The UE firstly determines the first DMRS port corresponding to the reference signal corresponding to the E-PDCCH to be received, and then receives the reference signal of the E-PDCCH on the subcarrier corresponding to the first DMRS port. The reference signal of the E-PDCCH may be a DMRS. Then the UE performs channel estimation according to the received reference signal, and performs blind detection in the first PRB resource to receive the data part corresponding to the first E-PDCCH candidate of the UE. A process of the blind detection mainly includes: performing demodulation on the data part (one or more eCCEs or CCEs) corresponding to the E-PDCCH candidate received in the first PRB resource, and then performing operations such as decoding and a CRC check to determine whether this E-PDCCH candidate is transmitted to the UE itself.

The E-PDCCH receiving method in this embodiment corresponds to the E-PDCCH transmitting method provided by the foregoing embodiment, and solves a reception problem of the E-PDCCH.

Optionally, the first PRB resource includes multiple PRB groups, and each PRB group includes multiple consecutive PRBs in the first PRB resource.

Then an optional implementation manner of step 803 includes: performing, according to a rule for cyclically using eCCEs in each PRB group and according to the reference signal and logical numbers of eCCEs in each PRB, blind detection on the eCCEs in each PRB group, so as to receive the data part corresponding to the first E-PDCCH candidate.

Optionally, a quantity of PRB groups included in the first PRB resource, and positions of consecutive PRBs and a quantity of consecutive PRBs included in each PRB group may be preset in a correspondence table.

Optionally, the quantity of PRB groups included in the first PRB resource, and the positions of consecutive PRBs and the quantity of consecutive PRBs included in each PRB group may also be determined by the UE in the process of receiving the first E-PDCCH candidate.

Figure 9:
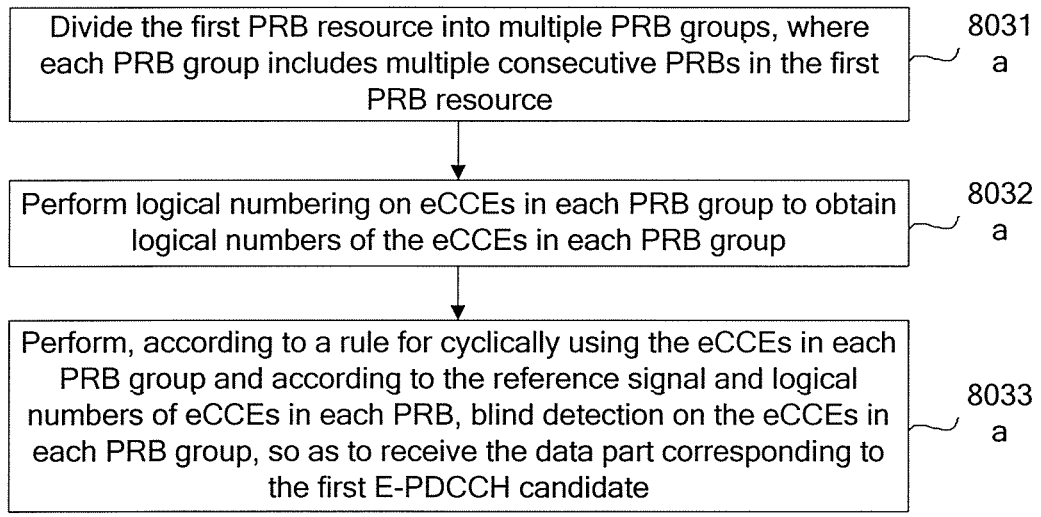
FIG. 9 is a flowchart of an implementation manner of step 803 according to an embodiment of the present invention.

Based on the implementation manner in which the UE determines the quantity of PRB groups included in the first PRB resource, and the positions of consecutive PRBs and the quantity of consecutive PRBs included in each PRB group in the process of receiving the first E-PDCCH candidate, another optional implementation manner of step 803 is shown in FIG. 9, and this implementation manner includes:

Step 8031*a*: Divide the first PRB resource into multiple PRB groups, where each PRB group includes multiple consecutive PRBs in the first PRB resource.

Step 8032*a*: Perform logical numbering on eCCEs in each PRB group to obtain logical numbers of the eCCEs in each PRB group.

Step 8033*a*: Perform, according to a rule for cyclically using the eCCEs in each PRB group and according to the reference signal and logical numbers of eCCEs in each PRB, blind detection on the eCCEs in each PRB group, so as to receive the data part corresponding to the first E-PDCCH candidate.

The process of performing blind detection on the eCCEs in each PRB group by the UE is similar to an existing process of blind detection, which is not described herein again.

Optionally, an implementation manner of step 8032*a*, namely, the manner of performing logical numbering on eCCEs in each PRB group, may be: performing consecutive numbering on the eCCEs in all PRBs in each PRB group in ascending order of indexes of the PRBs in each PRB group, to obtain the logical numbers of the eCCEs in each PRB group.

Optionally, another implementation manner of step 8032*a*, namely, another manner of performing logical numbering on eCCEs in each PRB group, may be: performing consecutive numbering on the eCCEs in all physical positions in each PRB group in ascending order of indexes of the physical positions of the eCCEs in the respective PRBs in each PRB group, to obtain the logical numbers of the eCCEs in each PRB group.

This implementation manner is similar to the foregoing process shown in FIG. 3A in which a base station selects a first eCCE resource for an E-PDCCH to be transmitted. The UE performs blind detection on the first PRB resource in a manner similar to that of the base station, which helps to reduce the number of times of blind detection performed by the UE, and helps to improve efficiency of receiving the E-PDCCH.

Optionally, the first PRB resource includes multiple PRB clusters, and each PRB cluster includes multiple consecutive or non-consecutive PRBs in the first PRB resource.

Then another optional implementation manner of step 803 includes: performing, according to a rule for cyclically using eCCEs in the first PRB resource and according to the reference signal and logical numbers of eCCEs in the first PRB resource, blind detection on the eCCEs in the first PRB resource, so as to receive the data part corresponding to the first E-PDCCH candidate.

Logical numbering performed on the eCCEs in the first PRB resource is used to map the first E-PDCCH candidate and other E-PDCCH candidates on the first aggregation level to at least two PRB clusters.

Optionally, a quantity of PRB clusters included in the first PRB resource, and positions of PRBs and a quantity of PRBs included in each PRB cluster may be preset in a correspondence table.

Optionally, the quantity of PRB clusters included in the first PRB resource, and the positions of PRBs and the quantity of PRBs included in each PRB cluster may also be determined by the UE in the process of receiving the first E-PDCCH candidate.

Figure 10:
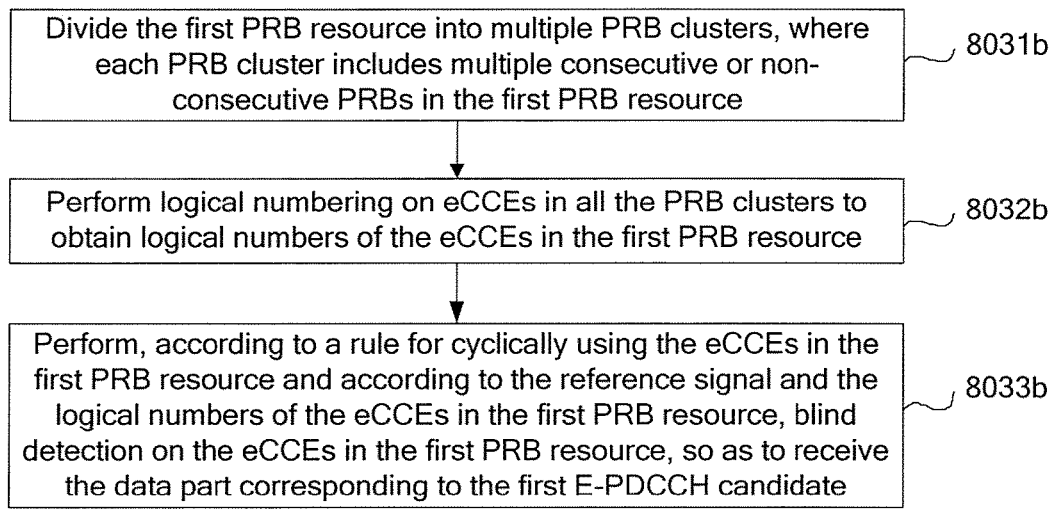
FIG. 10 is a flowchart of an implementation manner of step 803 according to another embodiment of the present invention.

Based on the implementation manner in which the UE determines the quantity of PRB clusters included in the first PRB resource, and positions of PRBs and the quantity of PRBs included in each PRB cluster in the process of receiving the first E-PDCCH candidate, another implementation manner of step 803 is shown in FIG. 10, and this implementation manner includes:

Step 8031*b*: Divide the first PRB resource into multiple PRB clusters, where each PRB cluster includes multiple consecutive or non-consecutive PRBs in the first PRB resource.

Step 8032*b*: Perform logical numbering on eCCEs in all the PRB clusters to obtain logical numbers of the eCCEs in the first PRB resource.

A purpose of performing logical numbering on the eCCEs in the first PRB resource is to map the first E-PDCCH candidate and other E-PDCCH candidates on the first aggregation level to at least two PRB clusters.

Step 8033*b*: Perform, according to a rule for cyclically using the eCCEs in the first PRB resource and according to the reference signal and the logical numbers of the eCCEs in the first PRB resource, blind detection on the eCCEs in the first PRB resource, so as to receive the data part corresponding to the first E-PDCCH candidate.

The process of performing blind detection on the eCCEs in the first PRB resource by the UE is similar to an existing process of blind detection, which is not described herein again.

Optionally, an implementation manner of step 8032*b*, namely, the manner of performing logical numbering on the eCCEs in the first PRB resource, may include: consecutively sorting the PRBs in all the PRB clusters in ascending order of indexes of the PRBs in the PRB clusters; and then performing consecutive numbering on eCCEs in all the sorted PRBs in ascending order of indexes of physical positions of the eCCEs in the respective PRBs among the sorted PRBs, to obtain the logical numbers of the eCCEs in the first PRB resource.

This implementation manner is similar to the foregoing process shown in FIG. 6 in which a base station selects a first eCCE resource for an E-PDCCH to be transmitted. The UE performs blind detection on the first PRB resource in a manner similar to that of the base station, which helps to reduce the number of times of blind detection performed by the UE, and helps to improve efficiency of receiving the E-PDCCH.

Corresponding to the manner in which a base station determines a corresponding DMRS port for a reference signal corresponding to an E-PDCCH candidate to be transmitted, the following embodiment of the present invention provides several implementation manners of step 801, that is, implementation manners in which the UE determines the first DMRS port.

An optional implementation manner of step 801 includes: determining the first DMRS port according to the first E-PDCCH candidate and a first correspondence. The first correspondence is a correspondence between an E-PDCCH and a DMRS port. Specifically, the UE may directly obtain, from the first correspondence, the first DMRS port corresponding to the reference signal corresponding to the first E-PDCCH candidate.

Optionally, the first correspondence may be determined according to multiple DMRS ports that are specified in advance and are cyclically used by each E-PDCCH candidate. Based on this, the process of determining the first DMRS port according to the first correspondence by the UE may be: calculating the first DMRS port according to formula (4) or formula (5). For the description of formula (4) or formula (5) and parameters thereof, reference may be made to the description in the foregoing embodiment.

It should be noted that for the UE, an index of the first E-PDCCH candidate to be received may be calculated. Therefore, the first DMRS port may be calculated directly according to formula (4) or formula (5). Optionally, before determining the first DMRS port corresponding to the reference signal corresponding to the first E-PDCCH candidate, the UE may receive first broadcast signaling or first RRC signaling transmitted by the base station, and obtain the first correspondence from the first broadcast signaling or first RRC signaling. The first broadcast signaling or first RRC signaling carries the first correspondence.

Optionally, the UE and the base station may also negotiate, determine, and save the first correspondence in advance, that is, predetermine the first correspondence in an implicit manner.

Another optional implementation manner of step 801 includes: determining the first DMRS port according to each eCCE in the first PRB resource and a second correspondence. The second correspondence is a correspondence between an eCCE and a DMRS port.

Because the UE does not know an eCCE to which the first E-PDCCH candidate is mapped, the UE may obtain, according to the second correspondence, a DMRS port corresponding to each eCCE in the first PRB resource, and use the DMRS port as the first DMRS port. Specifically, the UE attempts to receive, in each eCCE, the data part corresponding to the first E-PDCCH candidate. In this way, when the UE attempts reception in an eCCE, the UE uses a DMRS port corresponding to the eCCE in the second correspondence as the first DMRS port, attempts to receive, on the first DMRS port, the reference signal corresponding to the first E-PDCCH candidate, and finally completes attempting reception in the eCCE. A result of attempting reception in each eCCE may be that the data part corresponding to the first E-PDCCH candidate is received successfully, and may also be that the data part corresponding to the first E-PDCCH candidate is not successfully received.

Optionally, before determining the first DMRS port corresponding to the reference signal corresponding to the first E-PDCCH candidate, the UE may receive second broadcast signaling or second RRC signaling transmitted by the base station, and obtain the second correspondence from the second broadcast signaling or second RRC signaling. The second broadcast signaling or second RRC signaling carries the second correspondence.

Optionally, the UE and the base station may also negotiate, determine, and save the second correspondence in advance, that is, predetermine the second correspondence in an implicit manner.

Still another optional implementation manner of step 801 includes: obtaining the first DMRS port according to a preconfigured reference DMRS port corresponding to each PRB or each PRB group in the first PRB resource.

Because the UE does not know a PRB or a PRB group to which the first E-PDCCH candidate is mapped, the UE may use a reference DMRS port corresponding to each PRB or each PRB group in the first PRB resource as the first DMRS port. Specifically, the UE attempts to receive, in each eCCE, the data part corresponding to the first E-PDCCH candidate. In this way, when the UE attempts to receive, in an eCCE, the data part corresponding to the first E-PDCCH candidate, the UE uses a DMRS port corresponding to a PRB or a PRB group to which the eCCE belongs, as the first DMRS port, attempts to receive, on the first DMRS port, the reference signal corresponding to the first E-PDCCH candidate, and finally completes attempting reception in the eCCE. The UE may learn a PRB or a PRB group to which each eCCE belongs. For example, the UE may use the manner of step 803 to learn the PRB or PRB group to which each eCCE belongs, but the present invention is not limited thereto.

Optionally, before determining the first DMRS port corresponding to the reference signal corresponding to the first E-PDCCH candidate, the UE may receive third broadcast signaling or third RRC signaling transmitted by the base station, and obtain, from the third broadcast signaling or third RRC signaling, the reference DMRS port corresponding to each PRB or each PRB group in the first PRB resource. The third broadcast signaling or third RRC signaling carries the reference DMRS port corresponding to each PRB or each PRB group in the first PRB resource.

Corresponding operations or processes in the foregoing E-PDCCH receiving method correspond to operations or processes in the foregoing E-PDCCH transmitting method, help to reduce the number of times of blind detection performed by the UE, and help to improve efficiency of receiving the E-PDCCH.

Figure 11:
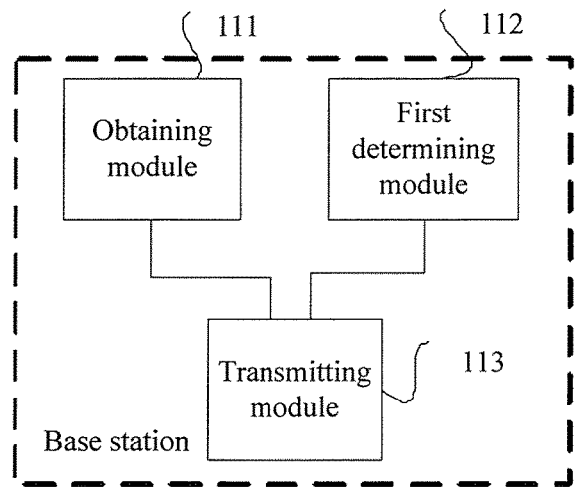
FIG. 11 is a schematic structural diagram of a base station according to an embodiment of the present invention.

FIG. 11 is a schematic structural diagram of a base station according to an embodiment of the present invention. As shown in FIG. 11, the base station in this embodiment includes an obtaining module 111, a first determining module 112, and a transmitting module 113.

The obtaining module 111 is configured to obtain, according to a first aggregation level to which a first E-PDCCH candidate belongs, a first eCCE or CCE resource to which the first E-PDCCH candidate is mapped in a first PRB resource. The first eCCE or CCE resource includes an eCCE or a CCE used for transmitting a data part corresponding to the first E-PDCCH candidate, and eCCE or CCE resources to which E-PDCCH candidates on the first aggregation level are mapped in the first PRB resource are different from each other. The first PRB resource includes a PRB in which an E-PDCCH candidate on each aggregation level and a PDSCH in each subframe are multiplexed, and the first E-PDCCH candidate is an E-PDCCH to be transmitted.

The first determining module 112 is configured to determine a first DMRS port corresponding to a reference signal corresponding to the first E-PDCCH candidate.

The transmitting module 113 is connected to the obtaining module 111 and the first determining module 112, and is configured to respectively transmit, on a subcarrier corresponding to the first DMRS port determined by the first determining module 112 and the first eCCE or CCE resource obtained by the obtaining module 111, the reference signal and the data part corresponding to the first E-PDCCH candidate.

The functional modules of the base station provided by this embodiment may be configured to execute the process of the method embodiment shown in FIG. 2. The detailed working principles thereof are not described herein again. For details, reference may be made to the description of the method embodiment.

The base station in this embodiment maps, according to an aggregation level of an E-PDCCH to be transmitted, the E-PDCCH to be transmitted, to an eCCE in a PRB resource used for transmitting the E-PDCCH, deter mines a DMRS port occupied for transmitting a reference signal of the E-PDCCH to be transmitted, and then transmits the E-PDCCH to be transmitted on a subcarrier corresponding to the determined DMRS port and the mapped eCCE resource, thereby solving the transmission problem of the E-PDCCH.

Figure 12:
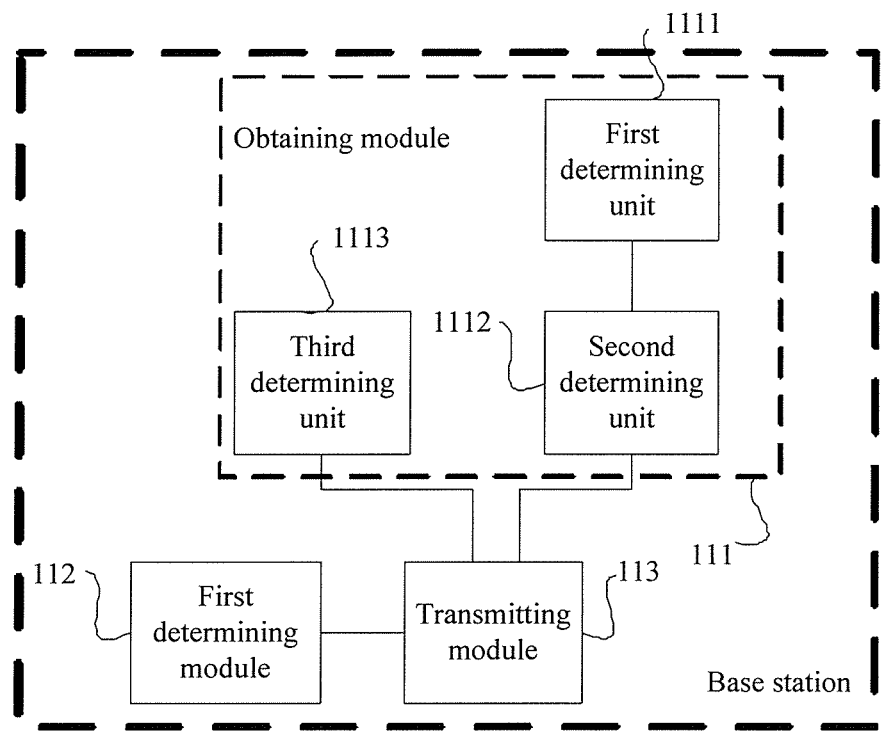
FIG. 12 is a schematic structural diagram of a base station according to another embodiment of the present invention.

FIG. 12 is a schematic structural diagram of a base station according to another embodiment of the present invention. This embodiment is implemented based on the embodiment shown in FIG. 11. As shown in FIG. 12, an implementation structure of the obtaining module 111 in this embodiment includes a first determining unit 1111 and a second determining unit 1112.

The first PRB resource includes multiple PRB groups, and each PRB group includes multiple consecutive PRBs in the first PRB resource. The first determining unit 1111 is configured to determine a first PRB group to which the first E-PDCCH candidate is mapped, where the first PRB group is one of the multiple PRB groups.

The second determining unit 1112 is connected to the first determining unit 1111, and is configured to determine, according to a rule for cyclically using eCCEs or CCEs in the first PRB group that is determined by the first determining unit 1111 and according to the first aggregation level, a logical number of an eCCE or a CCE occupied by the first E-PDCCH candidate in the first PRB group, and use the eCCE or CCE corresponding to the determined logical number as the first eCCE or CCE resource. The second determining unit 1112 is further connected to the transmitting module 113, and is configured to provide the first eCCE or CCE resource for the transmitting module 113.

Optionally, logical numbering is performed on the eCCEs or CCEs in the first PRB group in the following manner:
performing consecutive numbering on eCCEs or CCEs in all PRBs in the first PRB group in ascending order of indexes of the PRBs in the first PRB group, to obtain logical numbers of the eCCEs or CCEs in the first PRB group; or
performing consecutive numbering on eCCEs or CCEs in all physical positions in the first PRB group in ascending order of indexes of the physical positions of the eCCEs or CCEs in the respective PRBs in the first PRB group, to obtain logical numbers of the eCCEs or CCEs in the first PRB group.

Further, the second determining unit 1112 may be specifically configured to determine, according to formula (3), the logical number of the eCCE or CCE occupied by the first E-PDCCH candidate in the first PRB group. For the description of formula (3) and parameters thereof, reference may be made to the foregoing method embodiment.

Further, the first determining unit 1111 may be specifically configured to determine the first PRB group according to formula (1) or formula (2). For the description of formula (1) and formula (2) and parameters thereof, reference may be made to the foregoing method embodiment.

Optionally, the first PRB resource includes multiple PRB clusters, and each PRB cluster includes multiple consecutive or non-consecutive PRBs in the first PRB resource.

Further, another implementation structure of the obtaining module 111 may include a third determining unit 1113.

The third determining unit 1113 is configured to determine, according to a rule for cyclically using eCCEs or CCEs in the first PRB resource and according to the first aggregation level, a logical number of an eCCE or a CCE occupied by the first E-PDCCH candidate in the first PRB resource, and use the eCCE or CCE corresponding to the determined logical number as the first eCCE or CCE resource.

Logical numbering performed on the eCCEs or CCEs in the first PRB resource is used to map the first E-PDCCH candidate and other E-PDCCH candidates on the first aggregation level to at least two PRB clusters.

Optionally, logical numbering is performed on the eCCEs or CCEs in the first PRB resource in the following manner:
consecutively sorting the PRBs in all the PRB clusters in ascending order of indexes of the PRBs in the PRB clusters, and then performing consecutive numbering on eCCEs or CCEs in all the sorted PRBs in ascending order of indexes of physical positions of the eCCEs or CCEs in the respective PRBs among the sorted PRBs, to obtain logical numbers of the eCCEs or CCEs in the first PRB resource.

Optionally, the first determining module 112 in this embodiment may be specifically configured to determine the first DMRS port according to the first E-PDCCH candidate and a first correspondence, where the first correspondence is a correspondence between an E-PDCCH and a DMRS port.

For example, the first determining module 112 may be more specifically configured to determine the first DMRS port among multiple preset DMRS ports according to formula (4) or (5). For the description of formula (4) and (5) and parameters thereof, reference may be made to the foregoing method embodiment.

Based on the foregoing description, the transmitting module 113 in this embodiment may be further configured to transmit the first correspondence to a UE by using first broadcast signaling or first RRC signaling before respectively transmitting, on the subcarrier corresponding to the first DMRS port and the first eCCE or CCE resource, the reference signal and the data part corresponding to the first E-PDCCH candidate.

In addition, the base station and the UE may further predetermine the first correspondence in an implicit manner.

Optionally, the first determining module 112 may be specifically further configured to determine the first DMRS port according to the first eCCE or CCE resource and a second correspondence. The second correspondence is a correspondence between an eCCE or a CCE and a DMRS port.

For example, the first determining module 112 may be more specifically configured to obtain, according to the second correspondence, a DMRS port corresponding to one eCCE or CCE that has a smallest index in the first eCCE or CCE resource, and use the DMRS port corresponding to the one eCCE or CCE that has the smallest index as the first DMRS port; or the first determining module 112 may be more specifically configured to obtain, according to the second correspondence, DMRS ports corresponding to two eCCEs or CCEs that have a smallest index in the first eCCE or CCE resource, and use the DMRS ports corresponding to the two eCCEs or CCEs that have the smallest index as the first DMRS ports.

Further, the first determining module 112 may be more specifically configured to obtain, according to formula (6), the DMRS port corresponding to the one eCCE or CCE that has the smallest index, or the DMRS port corresponding to each eCCE or CCE of the two eCCEs or CCEs that have the smallest index, from multiple preconfigured DMRS ports. For the description of formula (6), reference may be made to the foregoing method embodiment.

Based on the foregoing description, the transmitting module 113 in this embodiment is further configured to transmit the second correspondence to the UE by using second broadcast signaling or second RRC signaling before respectively transmitting, on the subcarrier corresponding to the first DMRS port and the first eCCE or CCE resource, the reference signal and the data part corresponding to the first E-PDCCH candidate.

In addition to this, the base station and the UE may further predetermine the second correspondence in an implicit manner.

Optionally, the first determining module 112 may be specifically further configured to determine the first DMRS port according to a preconfigured reference DMRS port corresponding to a first PRB or the first PRB group, where the first PRB or first PRB group is a PRB or a PRB group in which the first eCCE or CCE resource is located.

For example, the first determining module 112 may be more specifically configured to use the reference DMRS port corresponding to the first PRB or first PRB group as the first DMRS port; or the first determining module 112 may be more specifically configured to determine the first DMRS port according to the reference DMRS port corresponding to the first PRB or first PRB group and a mapping sequence of the first E-PDCCH candidate in the first PRB or first PRB group; or the first determining module 112 may be more specifically configured to determine the first DMRS port according to the reference DMRS port corresponding to the first PRB or first PRB group and an index of an eCCE or a CCE that has a smallest or largest index in the first eCCE or CCE resource.

Still further, the first determining module 112 may be more specifically configured to determine the first DMRS port among multiple preset DMRS ports according to formula (7) or formula (8). For the description of formula (7) or (8), reference may be made to the foregoing method embodiment.

Based on the foregoing description, the transmitting module 113 in this embodiment is further configured to transmit a reference DMRS port corresponding to each PRB or each PRB group in the first PRB resource to the UE by using third broadcast signaling or third RRC signaling before respectively transmitting, on the subcarrier corresponding to the first DMRS port and the first eCCE or CCE resource, the reference signal and the data part corresponding to the first E-PDCCH candidate.

The functional modules or units of the base station provided by this embodiment may be configured to execute the corresponding process in the foregoing E-PDCCH transmitting method embodiment. The detailed working principles thereof are not described herein again.

The base station in this embodiment maps, according to an aggregation level of an E-PDCCH to be transmitted, the E-PDCCH to be transmitted, to an eCCE in a PRB resource used for transmitting the E-PDCCH, determines a DMRS port occupied for transmitting a reference signal of the E-PDCCH to be transmitted, and then transmits the E-PDCCH to be transmitted on a subcarrier corresponding to the determined DMRS port and the mapped eCCE resource, thereby solving the transmission problem of the E-PDCCH.

Figure 13:
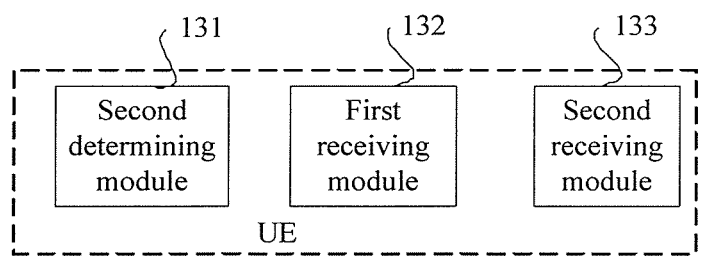
FIG. 13 is a schematic structural diagram of a UE according to an embodiment of the present invention.

FIG. 13 is a schematic structural diagram of a UE according to an embodiment of the present invention. As shown in FIG. 13, the UE in this embodiment includes a second determining module 131, a first receiving module 132, and a second receiving module 133.

The second determining module 131 is configured to determine a first DMRS port corresponding to a reference signal corresponding to a first E-PDCCH candidate, where the first E-PDCCH candidate is an E-PDCCH to be received.

The first receiving module 132 is connected to the second determining module 131, and is configured to receive, on a subcarrier corresponding to the first DMRS port determined by the second determining module 131, the reference signal corresponding to the first E-PDCCH candidate.

The second receiving module 133 is connected to the first receiving module 132, and is configured to perform blind detection in a first PRB resource according to the reference signal received by the first receiving module 132, so as to receive a data part corresponding to the first E-PDCCH candidate, where the first PRB resource includes a PRB in which an E-PDCCH candidate on each aggregation level and a PDSCH in each subframe are multiplexed.

The functional modules of the UE provided by this embodiment may be configured to execute the process of the E-PDCCH receiving method shown in FIG. 8. The detailed working principles thereof are not described herein again. For details, reference may be made to the description of the method embodiment.

The UE in this embodiment may cooperate with the base station provided by the foregoing embodiment of the present invention. The UE determines a DMRS port corresponding to a reference signal of an E-PDCCH to be received, receives, on the DMRS port, the reference signal of the E-PDCCH to be received, and performs, based on the received reference signal, blind detection on a PRB resource that transmits the E-PDCCH, so as to receive the E-PDCCH to be received, thereby solving the reception problem of the E-PDCCH.

Optionally, the first PRB resource may include multiple PRB groups, and each PRB group includes multiple consecutive PRBs in the first PRB resource. Then the second receiving module 133 is specifically configured to perform, according to a rule for cyclically using eCCEs or CCEs in each PRB group and according to the reference signal received by the first receiving module 132 and logical numbers of eCCEs or CCEs in each PRB, blind detection on the eCCEs or CCEs in each PRB group, so as to receive the data part corresponding to the first E-PDCCH candidate. Logical numbering is performed on the eCCEs or CCEs in each PRB group in the following manner:

performing consecutive numbering on eCCEs or CCEs in all PRBs in each PRB group in ascending order of indexes of the PRBs in each PRB group, to obtain logical numbers of the eCCEs or CCEs in each PRB group; or performing consecutive numbering on eCCEs or CCEs in all physical positions in each PRB group in ascending order of indexes of the physical positions of the eCCEs or CCEs in the respective PRBs in each PRB group, to obtain logical numbers of the eCCEs or CCEs in each PRB group.

Optionally, the first PRB resource may include multiple PRB clusters, and each PRB cluster includes multiple consecutive or non-consecutive PRBs in the first PRB resource. Then the second receiving module 133 in this embodiment may be specifically further configured to perform, according to a rule for cyclically using eCCEs or CCEs in the first PRB resource and according to the reference signal received by the first receiving module 132 and logical numbers of eCCEs or CCEs in the first PRB resource, blind detection on the eCCEs or CCEs in the first PRB resource, so as to receive the data part corresponding to the first E-PDCCH candidate.

Logical numbering performed on the eCCEs or CCEs in the first PRB resource is used to map the first E-PDCCH candidate and other E-PDCCH candidates on the first aggregation level to at least two PRB clusters.

Optionally, logical numbering is performed on the eCCEs or CCEs in the first PRB resource in the following manner:

consecutively sorting the PRBs in all the PRB clusters in ascending order of indexes of the PRBs in the PRB clusters, and then performing consecutive numbering on eCCEs or CCEs in all the sorted PRBs in ascending order of indexes of physical positions of the eCCEs or CCEs in the respective PRBs among the sorted PRBs, to obtain logical numbers of the eCCEs or CCEs in the first PRB resource.

Optionally, the second determining module 131 in this embodiment may be specifically configured to determine the first DMRS port according to the first E-PDCCH candidate and a first correspondence. The first correspondence is a correspondence between an E-PDCCH and a DMRS port.

For example, the second determining module 131 may be more specifically configured to determine the first DMRS port among multiple preset DMRS ports according to formula (4) or (5). For the description of formula (4) or (5), reference may be made to the foregoing method embodiment.

Based on the foregoing description, the first receiving module 132 in this embodiment may be further configured to receive, before receiving the reference signal on the subcarrier corresponding to the first DMRS port, first broadcast signaling or first RRC signaling transmitted by the base station, where the first broadcast signaling or first RRC signaling carries the first correspondence.

In addition, the base station and the UE may further predetermine the first correspondence in an implicit manner.

Optionally, the second determining module 131 in this embodiment may be specifically further configured to determine the first DMRS port according to the eCCEs or CCEs in the first PRB resource and a second correspondence, where the second correspondence is a correspondence between an eCCE or a CCE and a DMRS port.

For example, the second determining module 131 may be more specifically configured to obtain, according to the second correspondence, a DMRS port corresponding to each eCCE or CCE in the first PRB resource, and use the DMRS port as the first DMRS port.

Based on the foregoing description, the first receiving module 132 in this embodiment may be further configured to receive, before receiving the reference signal on the subcarrier corresponding to the first DMRS port, second broadcast signaling or second RRC signaling transmitted by the base station, where the second broadcast signaling or second RRC signaling carries the second correspondence.

In addition, the base station and the UE may further predetermine the second correspondence in an implicit manner.

Optionally, the second determining module 131 in this embodiment is specifically configured to determine the first DMRS port according to a preconfigured reference DMRS port corresponding to each PRB or each PRB group in the first PRB resource.

For example, the second determining module 131 may be more specifically configured to use the reference DMRS port corresponding to each PRB or each PRB group in the first PRB resource as the first DMRS port.

Based on the foregoing description, the first receiving module 132 in this embodiment may be further configured to receive, before receiving the reference signal on the subcarrier corresponding to the first DMRS port, third broadcast signaling or third RRC signaling transmitted by the base station, where the third broadcast signaling or third RRC signaling carries the reference DMRS port corresponding to each PRB or each PRB group in the first PRB resource.

The functional modules or units of the UE provided by this embodiment may be configured to execute the corresponding process of the foregoing E-PDCCH receiving method embodiment. The detailed working principles thereof are not described herein again. For details, reference may be made to the description of the method embodiment.

The UE in this embodiment may cooperate with the base station provided by the foregoing embodiment of the present invention. The UE obtains a DMRS port that may be used by an E-PDCCH to be received, receives, on the DMRS port, a reference signal of the E-PDCCH to be received, and performs, based on the received reference signal, blind detection on a PRB resource that transmits the E-PDCCH, so as to receive the E-PDCCH to be received, thereby solving the reception problem of the E-PDCCH.

Persons of ordinary skill in the art may understand that all or a part of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:
1. A method for transmitting information on an enhanced physical downlink control channel (E-PDCCH), comprising:
obtaining a first resource comprising a data part of a first E-PDCCH candidate, wherein the first resource is an enhanced control channel element (eCCE) for trans- mitting the data part or the first resource is a control channel element (CCE) resource for transmitting the data part;

determining a first demodulation reference signal (DMRS) port corresponding to a reference signal for the first E-PDCCH candidate;

transmitting the reference signal on a subcarrier corresponding to the first DMRS port;

transmitting the data part of the first E-PDCCH candidate using the first resource;

wherein the first DMRS port is determined according to a preconfigured reference DMRS port corresponding to a first resource block pair (PRB) or a first PRB group, and the first DMRS port is determined according to an index of an eCCE or a CCE that has a smallest or largest index value in the first resource, wherein the first PRB or first PRB group is a PRB or a PRB group in which the first resource is located;

the first E-PDCCH candidate is mapped in a first resource block pair (PRB) resource;

the first PRB resource comprises multiple PRB groups, and each PRB group comprises multiple consecutive PRBs in the first PRB resource; and wherein obtaining the first resource comprises:

determining a first PRB group to which the first E-PDCCH candidate is mapped, wherein the first PRB group is one of the multiple PRB groups, determining, according to a rule for cyclically using eCCEs or CCEs in the first PRB group and according to a first aggregation level to which a first E-PDCCH candidate belongs, a logical number of an eCCE or a CCE occupied by the first E-PDCCH candidate in the first PRB group, and using the eCCE or CCE corresponding to the determined logical number as the first resource.

2. The method according to claim 1, wherein logical numbering is performed on the eCCEs or CCEs in the first PRB group in the following manner:

performing consecutive numbering on eCCEs or CCEs in all PRBs in the first PRB group in ascending order of indexes of the PRBs in the first PRB group, to obtain logical numbers of the eCCEs or CCEs in the first PRB group; or performing consecutive numbering on eCCEs or CCEs in all physical positions in the first PRB group in ascending order of indexes of the physical positions of the eCCEs or CCEs in respective PRBs in the first PRB group, to obtain logical numbers of the eCCEs or CCEs in the first PRB group.

3. The method according to claim 1, wherein determining, according to a rule for cyclically using eCCEs or CCEs in the first PRB group and according to a first aggregation level to which a first E-PDCCH candidate belongs, a logical number of an eCCE or a CCE occupied by the first E-PDCCH candidate in the first PRB group, comprises:

determining, according to a formula $P_{num}=\{L\cdot m+(k\cdot L\cdot M) \mod(K\cdot N_{PRB})+i\} \mod(K\cdot N_{PRB})$, the logical number of the eCCE or CCE occupied by the first E-PDCCH candidate in the first PRB group;

wherein, $P_{num}$ is the logical number of the eCCE or CCE occupied by the first E-PDCCH candidate in the first PRB group;

k is an index of a UE corresponding to the first E-PDCCH candidate;

L is a quantity of aggregation levels;

i is the first aggregation level, wherein i=0, 1, 2, . . . , L;

M is a quantity of E-PDCCH candidates on the first aggregation level;

m is an index of the first E-PDCCH candidate, wherein m=0, 1, 2, . . . , M;

$N_{PRB}$ is a quantity of PRBs in the first PRB group;

K is a quantity of eCCEs or CCEs in each PRB; and mod is a modulo operator.

4. The method according to claim 1, wherein determining a first PRB group to which the first E-PDCCH candidate is mapped, comprises:

obtaining the first PRB group according to a formula $j=(m+\sigma) \mod S$ or a formula $$j = \left\lfloor (m+\sigma) \cdot \frac{S}{M} \right\rfloor \mod S;$$

wherein, j is an index of the first PRB group;

m is an index of the first E-PDCCH candidate, wherein m=0, 1, 2, . . . , M;

σ is an index offset value pre-allocated to a UE corresponding to the first E-PDCCH candidate, and a value thereof is determined according to an identity of the UE and the first aggregation level;

S is a quantity of PRB groups in the first PRB resource;

M is a quantity of E-PDCCH candidates on the first aggregation level; and mod is a modulo operator.

5. The method according to claim 1, wherein:

the first E-PDCCH candidate is mapped in a first resource block pair (PRB) resource;

the first PRB resource comprises multiple PRB clusters, and each PRB cluster comprises multiple consecutive or non-consecutive PRBs in the first PRB resource; and wherein obtaining the first resource, comprises:

determining, according to a rule for cyclically using eCCEs or CCEs in the first PRB resource and according to a first aggregation level to which a first E-PDCCH candidate belongs, a logical number of an eCCE or a CCE occupied by the first E-PDCCH candidate in the first PRB resource, wherein logical numbering performed on the eCCEs or CCEs in the first PRB resource is used to map the first E-PDCCH candidate and other E-PDCCH candidates on the first aggregation level to at least two of the PRB clusters, and using the eCCE or CCE corresponding to the determined logical number as the first resource.

6. The method according to claim 5, wherein logical numbering is performed on the eCCEs or CCEs in the first PRB resource in the following manner:

consecutively sorting the PRBs in all the PRB clusters in ascending order of indexes of the PRBs in the PRB clusters; and performing consecutive numbering on eCCEs or CCEs in all the sorted PRBs in ascending order of indexes of physical positions of the eCCEs or CCEs in the respective PRBs among the sorted PRBs, to obtain logical numbers of the eCCEs or CCEs in the first PRB resource.

7. The method according to claim 1, wherein determining a first DMRS port corresponding to a reference signal for the first E-PDCCH candidate, comprises:

determining the first DMRS port according to the first E-PDCCH candidate and a first correspondence, wherein the first correspondence is a correspondence between an E-PDCCH and a DMRS port.

8. The method according to claim 7, wherein determining the first DMRS port according to the first E-PDCCH candidate and a first correspondence, comprises:
determining the first DMRS port among multiple preconfigured DMRS ports according to a formula $AP_{num}=(m+\sigma)\bmod P$ or a formula $AP_{num}=a+(m+\sigma)\bmod P$;
wherein, $AP_{num}$ is an index of the first DMRS port;
m is the index of the first E-PDCCH candidate, wherein m=0, 1, 2, . . . , M, and M is the quantity of E-PDCCH candidates on the first aggregation level;
P is a quantity of the multiple DMRS ports;
σ is the index offset value pre-allocated to the UE corresponding to the first E-PDCCH candidate, and a value thereof is determined according to the identity of the UE and the first aggregation level;
a is a constant; and
mod is the modulo operator.

9. The method according to claim 7, wherein before transmitting the reference signal on a subcarrier corresponding to the first DMRS port, and transmitting the data part of the first E-PDCCH candidate using the first resource, the method comprises:
transmitting the first correspondence to the UE by using first broadcast signaling or first RRC signaling; or
negotiating and determining the first correspondence with the UE in advance.

10. The method according to claim 1, wherein determining a first DMRS port corresponding to a reference signal for the first E-PDCCH candidate, comprises:
determining the first DMRS port according to the first resource and a second correspondence, wherein the second correspondence is a correspondence between an eCCE or a CCE and a DMRS port.

11. The method according to claim 10, wherein determining the first DMRS port according to the first resource and a second correspondence, comprises:
obtaining, according to the second correspondence, a DMRS port corresponding to one eCCE or CCE that has a smallest index in the first resource, and using the DMRS port corresponding to the one eCCE or CCE that has the smallest index as the first DMRS port; or
obtaining, according to the second correspondence, DMRS ports corresponding to two eCCEs or CCEs that have a smallest index in the first resource, and using the DMRS ports corresponding to the two eCCEs or CCEs that have the smallest index as the first DMRS ports.

12. The method according to claim 11, wherein obtaining, according to the second correspondence, a DMRS port corresponding to one eCCE or CCE that has a smallest index, or a DMRS port corresponding to each eCCE or CCE of two eCCEs or CCEs that have a smallest index, comprises:
obtaining, according to a formula $AP_{num}=a+(x+\sigma)\bmod P$, the DMRS port corresponding to the one eCCE or CCE that has the smallest index, or the DMRS port corresponding to each eCCE or CCE of the two eCCEs or CCEs that have the smallest index, from multiple preset DMRS ports;
wherein, $AP_{num}$ is an index of the first DMRS port;
x is the index of the one eCCE or CCE that has the smallest index or the index of each eCCE or CCE of the two eCCEs or CCEs that have the smallest index;
P is a quantity of the multiple DMRS ports;
σ is the index offset value pre-allocated to the UE corresponding to the first E-PDCCH candidate, and a value thereof is determined according to the identity of the UE and the first aggregation level;
a is a constant; and
mod is the modulo operator.

13. The method according to claim 10, wherein before transmitting the reference signal on a subcarrier corresponding to the first DMRS port, and transmitting the data part of the first E-PDCCH candidate using the first resource, the method comprises:
transmitting the second correspondence to the UE by using second broadcast signaling or second RRC signaling; or
negotiating and determining the second correspondence with the UE in advance.

14. The method according to claim 1, wherein:
determining the first DMRS port according to the reference DMRS port corresponding to the first PRB or first PRB group and a mapping sequence of the first E-PDCCH candidate in the first PRB or first PRB group, comprises:
determining the first DMRS port among multiple preconfigured DMRS ports according to a formula $AP_{num}=a+(p-a+y1)\bmod P$; or
determining the first DMRS port according to the reference DMRS port corresponding to the first PRB or first PRB group and an index of an eCCE or a CCE that has a smallest or largest index value in the first resource, comprises:
determining the first DMRS port among the multiple DMRS ports according to a formula $AP_{num}=a+(p-a+y2)\bmod P$;
wherein, $AP_{num}$ is an index of the first DMRS port;
P is a quantity of the multiple DMRS ports;
p is an index of the reference DMRS port corresponding to the first PRB or first PRB group;
y1 is the mapping sequence of the first E-PDCCH candidate in the first PRB or first PRB group, wherein y1=0, . . . , C−1, and C is a total quantity of E-PDCCH candidates on the first aggregation level that are mapped to the first PRB or first PRB group;
y2 is the index of the eCCE or CCE that has the smallest or largest index value in the first resource;
a is a constant; and
mod is the modulo operator.

15. The method according to claim 1, wherein before transmitting the reference signal on a subcarrier corresponding to the first DMRS port, and transmitting the data part of the first E-PDCCH candidate using the first resource, the method comprises:
transmitting a reference DMRS port corresponding to each PRB or each PRB group in the first PRB resource to the UE by using third broadcast signaling or third RRC signaling.

16. A method for receiving information on an enhanced physical downlink control channel (E-PDCCH), comprising:
determining a first demodulation reference signal (DMRS) port corresponding to a reference signal for a first E-PDCCH candidate, wherein the first E-PDCCH candidate is an E-PDCCH to be received;
receiving the reference signal on a subcarrier corresponding to the first DMRS port;
performing blind detection in a first resource block pair (PRB) resource according to the reference signal, so as to receive a data part of the first E-PDCCH candidate, wherein the first PRB resource comprises a PRB in which an E-PDCCH candidate on each aggregation level and a physical downlink shared channel (PDSCH) in each subframe are multiplexed;

wherein the first DMRS port is determined according to a preconfigured reference DMRS port corresponding to each PRB or each PRB group, and the first DMRS port is determined according to an index of an enhanced control channel element (eCCE) or a control channel element (CCE) that has a smallest or largest index value in the first PRB resource;

the first PRB resource comprises multiple PRB groups, and each PRB group comprises multiple consecutive PRBs in the first PRB resource; and performing blind detection in a first PRB resource according to the reference signal, so as to receive a data part of the first E-PDCCH candidate, comprises:

performing, according to a rule for cyclically using enhanced control channel elements (eCCEs) or control channel elements (CCEs) in each PRB group and according to the reference signal and logical numbers of eCCEs or CCEs in each PRB, blind detection on the eCCEs or CCEs in each PRB group, so as to receive the data part of the first E-PDCCH candidate.

17. The method according to claim 16, wherein logical numbering is performed on the eCCEs or CCEs in each PRB group in the following manner:

performing consecutive numbering on eCCEs or CCEs in all PRBs in each PRB group in ascending order of indexes of the PRBs in each PRB group, to obtain logical numbers of the eCCEs or CCEs in each PRB group; or performing consecutive numbering on eCCEs or CCEs in all physical positions in each PRB group in ascending order of indexes of the physical positions of the eCCEs or CCEs in respective PRBs in each PRB group, to obtain logical numbers of the eCCEs or CCEs in each PRB group.

18. The method according to claim 16, wherein:

the first PRB resource comprises multiple PRB clusters, and each PRB cluster comprises multiple consecutive or non-consecutive PRBs in the first PRB resource; and performing blind detection in a first PRB resource according to the reference signal, so as to receive a data part of the first E-PDCCH candidate, comprises:

performing, according to a rule for cyclically using eCCEs or CCEs in the first PRB resource and according to the reference signal and logical numbers of eCCEs or CCEs in the first PRB resource, blind detection on the eCCEs or CCEs in the first PRB resource, so as to receive the data part of the first E-PDCCH candidate;

wherein logical numbering performed on the eCCEs or CCEs in the first PRB resource is used to map the first E-PDCCH candidate and other E-PDCCH candidates on the first aggregation level to at least two of the PRB clusters.

19. The method according to claim 18, wherein logical numbering is performed on the eCCEs or CCEs in the first PRB resource in the following manner:

consecutively sorting PRBs in all the PRB clusters in ascending order of indexes of the PRBs in each PRB cluster; and performing consecutive numbering on eCCEs or CCEs in all the sorted PRBs in ascending order of indexes of physical positions of the eCCEs or CCEs in the respective PRBs among the sorted PRBs, to obtain the logical numbers of the eCCEs or CCEs in the first PRB resource.

20. The method according to claim 16, wherein determining a first DMRS port corresponding to a reference signal corresponding to a first E-PDCCH candidate, comprises:

determining the first DMRS port according to the first E-PDCCH candidate and a first correspondence, wherein the first correspondence is a correspondence between an E-PDCCH and a DMRS port.

21. The method according to claim 20, wherein determining the first DMRS port according to the first E-PDCCH candidate and a first correspondence, comprises:

determining the first DMRS port among multiple preset DMRS ports according to a formula $AP_{num}=(m+\sigma) \bmod P$ or a formula $AP_{num}=a+(m+\sigma) \bmod P$;

wherein, $AP_{num}$ is an index of the first DMRS port;

m is an index of the first E-PDCCH candidate, wherein m=0, 1, 2, . . . , M, and M is a quantity of E-PDCCH candidates on the first aggregation level to which the first E-PDCCH candidate belongs;

P is a quantity of the multiple DMRS ports;

$\sigma$ is an index offset value pre-allocated by a base station, and a value thereof is determined according to an identity of a UE corresponding to the first E-PDCCH candidate and the first aggregation level;

a is a constant; and mod is a modulo operator.

22. The method according to claim 20, wherein before determining a first DMRS port corresponding to a reference signal corresponding to a first E-PDCCH candidate, the method comprises:

receiving first broadcast signaling or first RRC signaling transmitted by a base station, wherein the first broadcast signaling or first RRC signaling carries the first correspondence; or negotiating and determining the first correspondence with a base station in advance.

23. The method according to claim 16, wherein determining a first DMRS port corresponding to a reference signal corresponding to a first E-PDCCH candidate, comprises:

determining the first DMRS port according to the eCCEs or CCEs in the first PRB resource and a second correspondence, wherein the second correspondence is a correspondence between an eCCE or a CCE and a DMRS port.

24. The method according to claim 23, wherein determining the first DMRS port according to the eCCEs or CCEs in the first PRB resource and a second correspondence, comprises:

obtaining, according to the second correspondence, a DMRS port corresponding to each eCCE or CCE in the first PRB resource, and using the DMRS port as the first DMRS port.

25. The method according to claim 23, wherein before determining a first DMRS port corresponding to a reference signal corresponding to a first E-PDCCH candidate, the method comprises:

receiving second broadcast signaling or second RRC signaling transmitted by a base station, wherein the second broadcast signaling or second RRC signaling carries the second correspondence; or negotiating and determining the second correspondence with a base station in advance.

26. The method according to claim 16, wherein before determining a first DMRS port corresponding to a reference signal corresponding to a first E-PDCCH candidate, the method comprises:

receiving third broadcast signaling or third RRC signaling transmitted by a base station, wherein the third broadcast signaling or third RRC signaling carries the reference DMRS port corresponding to each PRB or each PRB group in the first PRB resource.

27. A base station, comprising:
a transceiver;
a processor coupled to the transceiver;
a computer readable medium coupled to the processor and storing a program, wherein the processor executes the program to:
obtain a first resource comprising a data part of a first E-PDCCH candidate, wherein the first resource is an enhanced control channel element (eCCE) for transmitting the data part or the first resource is a control channel element (CCE) resource for transmitting the data part;
determine a first demodulation reference signal (DMRS) port corresponding to a reference signal for the first E-PDCCH candidate according to a preconfigured reference DMRS port corresponding to a first resource block pair (PRB) or a first PRB group, and determine a first demodulation reference signal (DMRS) port corresponding to a reference signal for the first E-PDCCH candidate according to an index of an eCCE or a CCE that has a smallest or largest index value in the first resource;
wherein the transceiver is configured to transmit the reference signal on a subcarrier corresponding to the first DMRS port and transmit the data part of the first E-PDCCH candidate using the first resource;
wherein the first PRB or first PRB group is a PRB or a PRB group in which the first resource is located;
the first E-PDCCH candidate is mapped in a first resource block pair (PRB) resource;
the first PRB resource comprises multiple PRB groups, and each PRB group comprises multiple consecutive PRBs in the first PRB resource; and
the program to obtain a first resource comprises instructions to:
determine a first PRB group to which the first E-PDCCH candidate is mapped, wherein the first PRB group is one of the multiple PRB groups,
determine, according to a rule for cyclically using eCCEs or CCEs in the first PRB group and according to a first aggregation level to which a first E-PDCCH candidate belongs, a logical number of an eCCE or a CCE occupied by the first E-PDCCH candidate in the first PRB group, and
use the eCCE or CCE corresponding to the determined logical number as the first resource.

28. The base station according to claim 27, wherein logical numbering is performed on the eCCEs or CCEs in the first PRB group in the following manner:
performing consecutive numbering on eCCEs or CCEs in all PRBs in the first PRB group in ascending order of indexes of the PRBs in the first PRB group, to obtain logical numbers of the eCCEs or CCEs in the first PRB group; or
performing consecutive numbering on eCCEs or CCEs in all physical positions in the first PRB group in ascending order of indexes of the physical positions of the eCCEs or CCEs in respective PRBs in the first PRB group, to obtain logical numbers of the eCCEs or CCEs in the first PRB group.

29. The base station according to claim 27, wherein the instruction to determine, according to a rule for cyclically using eCCEs or CCEs in the first PRB group and according to a first aggregation level to which a first E-PDCCH candidate belongs, a logical number of an eCCE or a CCE occupied by the first E-PDCCH candidate in the first PRB group, comprises an instruction to determine, according to a formula $P_{num} = \{L \cdot m + (k \cdot L \cdot M) \bmod (K \cdot N_{PRB}) + i\} \bmod (K \cdot N_{PRB})$, the logical number of the eCCE or the CCE occupied by the first E-PDCCH candidate in the first PRB group;
wherein, $P_{num}$ is the logical number of the eCCE or CCE occupied by the first E-PDCCH candidate in the first PRB group;
k is an index of a UE corresponding to the first E-PDCCH candidate;
L is a quantity of aggregation levels;
i is the first aggregation level, wherein i=0, 1, 2, ..., L;
M is a quantity of E-PDCCH candidates on the first aggregation level;
m is an index of the first E-PDCCH candidate, wherein m=0, 1, 2, ..., M;
$N_{PRB}$ is a quantity of PRBs in the first PRB group;
K is a quantity of eCCEs or CCEs in each PRB; and
mod is a modulo operator.

30. The base station according to claim 27, wherein the instruction to determine a first PRB group to which the first E-PDCCH candidate is mapped, comprises an instruction to determine the first PRB group according to a formula j=(m+σ)mod S or a formula $$j = \left\lfloor (m+\sigma) \cdot \frac{S}{M} \right\rfloor \bmod S;$$

wherein, j is an index of the first PRB group;
m is an index of the first E-PDCCH candidate, wherein m=0, 1, 2, ..., M;
σ is an index offset value pre-allocated to a UE corresponding to the first E-PDCCH candidate, and a value thereof is determined according to an identity of the UE and the first aggregation level;
S is a quantity of PRB groups in the first PRB resource;
M is a quantity of E-PDCCH candidates on the first aggregation level; and
mod is a modulo operator.

31. The base station according to claim 27, wherein:
the first E-PDCCH candidate is mapped in a first resource block pair (PRB) resource;
the first PRB resource comprises multiple PRB clusters, and each PRB cluster comprises multiple consecutive or non-consecutive PRBs in the first PRB resource; and
the program to obtain a first resource, comprises instructions to:
determine, according to a rule for cyclically using eCCEs or CCEs in the first PRB resource and according to a first aggregation level to which a first E-PDCCH candidate belongs, a logical number of an eCCE or a CCE occupied by the first E-PDCCH candidate in the first PRB resource, and
use the eCCE or CCE corresponding to the determined logical number as the first resource,
wherein logical numbering performed on the eCCEs or CCEs in the first PRB resource is used to map the first E-PDCCH candidate and other E-PDCCH candidates on the first aggregation level to at least two of the PRB clusters.

32. The base station according to claim 31, wherein logical numbering is performed on the eCCEs or CCEs in the first PRB resource in the following manner:

consecutively sorting the PRBs in all the PRB clusters in ascending order of indexes of the PRBs in the PRB clusters, and then performing consecutive numbering on eCCEs or CCEs in all the sorted PRBs in ascending order of indexes of physical positions of the eCCEs or CCEs in the respective PRBs among the sorted PRBs, to obtain logical numbers of the eCCEs or CCEs in the first PRB resource.

33. The base station according to claim 27, wherein the program to determine a first DMRS port corresponding to a reference signal for the first E-PDCCH candidate, comprises an instruction to determine the first DMRS port according to the first E-PDCCH candidate and a first correspondence, wherein the first correspondence is a correspondence between an E-PDCCH and a DMRS port.

34. The base station according to claim 33, wherein the instruction to determine the first DMRS port according to the first E-PDCCH candidate and a first correspondence, comprises an instruction to determine the first DMRS port among multiple preset DMRS ports according to a formula $AP_{num}=(m+\sigma)\mod P$ or a formula $AP_{num}=a+(m+\sigma)\mod P$;
wherein, $AP_{num}$ is an index of the first DMRS port;
m is the index of the first E-PDCCH candidate, wherein m=0, 1, 2, ..., M, and M is the quantity of E-PDCCH candidates on the first aggregation level;
P is a quantity of the multiple DMRS ports;
σ is the index offset value pre-allocated to the UE corresponding to the first E-PDCCH candidate, and a value thereof is determined according to the identity of the UE and the first aggregation level;
a is a constant; and
mod is the modulo operator.

35. The base station according to claim 33, wherein the transceiver is further configured to:
before transmitting, the reference signal on a subcarrier corresponding to the first DMRS port and transmitting the data part of the first E-PDCCH candidate using the first resource, transmit the first correspondence to the UE by using first broadcast signaling or first RRC signaling.

36. The base station according to claim 27, wherein the program to determine a first DMRS port corresponding to a reference signal for the first E-PDCCH candidate, comprises an instruction to determine the first DMRS port according to the first resource and a second correspondence, wherein the second correspondence is a correspondence between an eCCE or a CCE and a DMRS port.

37. The base station according to claim 36, wherein the instruction to determine the first DMRS port according to the first resource and a second correspondence, comprises instructions to:
obtain, according to the second correspondence, a DMRS port corresponding to one eCCE or CCE that has a smallest index in the first resource, and use the DMRS port corresponding to the one eCCE or CCE that has the smallest index as the first DMRS port; or
obtain, according to the second correspondence, DMRS ports corresponding to two eCCEs or CCEs that have a smallest index in the first resource, and use the DMRS ports corresponding to the two eCCEs or CCEs that have the smallest index as the first DMRS ports.

38. The base station according to claim 37, wherein the instruction to obtain, according to the second correspondence, a DMRS port corresponding to one eCCE or CCE that has a smallest index, or a DMRS port corresponding to each eCCE or CCE of two eCCEs or CCEs that have a smallest index, comprises an instruction to obtain, according to a formula $AP_{num}=a+(x+\sigma)\mod P$, the DMRS port corresponding to the one eCCE or CCE that has the smallest index, or the DMRS port corresponding to each eCCE or CCE of the two eCCEs or CCEs that have the smallest index, from multiple preset DMRS ports;
wherein, $AP_{num}$ is an index of the first DMRS port;
x is the index of the one eCCE or CCE that has the smallest index or the index of each eCCE or CCE of the two eCCEs or CCEs that have the smallest index;
P is a quantity of the multiple DMRS ports;
σ is the index offset value preallocated to the UE corresponding to the first E-PDCCH candidate, and a value thereof is determined according to the identity of the UE and the first aggregation level;
a is a constant; and
mod is the modulo operator.

39. The base station according to claim 36, wherein the transceiver is further configured to:
before transmitting the reference signal on a subcarrier corresponding to the first DMRS port and transmitting the data part of the first E-PDCCH candidate using the first resource, transmit the second correspondence to the UE by using second broadcast signaling or second RRC signaling.

40. The base station according to claim 27, wherein the program to determine the first DMRS port according to the reference DMRS port corresponding to the first PRB or first PRB group and a mapping sequence of the first E-PDCCH candidate in the first PRB or first PRB group, comprises an instruction to:
determine the first DMRS port among multiple preset DMRS ports according to a formula $AP_{num}=a+(p-a+y1)\mod P$; or
determine the first DMRS port among multiple DMRS ports according to a formula $AP_{num}=a+(p-a+y2)\mod P$;
wherein, $AP_{num}$ is an index of the first DMRS port;
P is a quantity of the multiple DMRS ports;
p is an index of the reference DMRS port corresponding to the first PRB or first PRB group;
y1 is the mapping sequence of the first E-PDCCH candidate in the first PRB or first PRB group, wherein y1=0, ..., C−1, and C is a total quantity of E-PDCCH candidates on the first aggregation level that are mapped to the first PRB or first PRB group;
y2 is the index of the eCCE or CCE that has the smallest or largest index in the first resource;
a is a constant; and
mod is the modulo operator.

41. The base station according to claim 27, wherein the transceiver is further configured to:
before transmitting the reference signal on a subcarrier corresponding to the first DMRS port and transmitting the data part of the first E-PDCCH candidate using the first resource, transmit a reference DMRS port corresponding to each PRB or each PRB group in the first PRB resource to the UE by using third broadcast signaling or third RRC signaling.

42. A user equipment, comprising:
a transceiver;
a processor coupled to the transceiver;
a computer readable medium coupled to the processor and storing a program, wherein the processor executes the program to:
determine a first demodulation reference signal (DMRS) port corresponding to a reference signal for a first enhanced physical downlink control channel (E-PDCCH) candidate, wherein the first E-PDCCH candidate is an E-PDCCH to be received; and perform blind detection in a first resource block pair (PRB) resource according to the reference signal received by the transceiver, so as to receive a data part of the first E-PDCCH candidate, wherein the first PRB resource comprises a PRB in which an E-PDCCH candidate on each aggregation level and a physical downlink shared channel (PDSCH) in each subframe are multiplexed;

wherein the first DMRS port is determined according to a preconfigured reference DMRS port corresponding to each PRB or each PRB group, and the first DMRS port is determined according to an index of an enhanced control channel element (eCCE) or a control channel element (CCE) that has a smallest or largest index value in the first PRB resource;

the first PRB resource comprises multiple PRB groups, and each PRB group comprises multiple consecutive PRBs in the first PRB resource; and the program to perform blind detection in a first PRB resource according to the reference signal, so as to receive a data part of the first E-PDCCH candidate, comprises:

instructions to perform, according to a rule for cyclically using enhanced control channel element (eCCEs) or control channel elements (CCEs) in each PRB group and according to the reference signal and logical numbers of eCCEs or CCEs in each PRB, and blind detection on the eCCEs or CCEs in each PRB group, so as to receive the data part of the first E-PDCCH candidate.

43. The user equipment according to claim 42, wherein logical numbering is performed on the eCCEs or CCEs in the first PRB resource in the following manner:

performing consecutive numbering on eCCEs or CCEs in all PRBs in each PRB group in ascending order of indexes of the PRBs in each PRB group, to obtain logical numbers of the eCCEs or CCEs in each PRB group; or performing consecutive numbering on eCCEs or CCEs in all physical positions in each PRB group in ascending order of indexes of the physical positions of the eCCEs or CCEs in respective PRBs in each PRB group, to obtain logical numbers of the eCCEs or CCEs in each PRB group.

44. The user equipment according to claim 42, wherein: the first PRB resource comprises multiple PRB clusters, and each PRB cluster comprises multiple consecutive or non-consecutive PRBs in the first PRB resource;

the program to perform blind detection in a first PRB resource according to the reference signal, so as to receive a data part of the first E-PDCCH candidate, comprises instructions to perform, according to a rule for cyclically using eCCEs or CCEs in the first PRB resource and according to the reference signal and logical numbers of eCCEs or CCEs in the first PRB resource, and blind detection on the eCCEs or CCEs in the first PRB resource, so as to receive the data part of the first E-PDCCH candidate;

wherein logical numbering performed on the eCCEs or CCEs in the first PRB resource is used to map the first E-PDCCH candidate and other E-PDCCH candidates on the first aggregation level to at least two of the PRB clusters.

45. The user equipment according to claim 44, wherein logical numbering is performed on the eCCEs or CCEs in the first PRB resource in the following manner:

consecutively sorting PRBs in all the PRB clusters in ascending order of indexes of the PRBs in each PRB cluster, and then performing consecutive numbering on eCCEs or CCEs in all the sorted PRBs in ascending order of indexes of physical positions of the eCCEs or CCEs in the respective PRBs among the sorted PRBs, to obtain the logical numbers of the eCCEs or CCEs in the first PRB resource.

46. The user equipment according to claim 42, wherein the program to determine a first DMRS port corresponding to a reference signal corresponding to a first E-PDCCH candidate, comprises an instruction to determine the first DMRS port according to the first E-PDCCH candidate and a first correspondence, wherein the first correspondence is a correspondence between an E-PDCCH and a DMRS port.

47. The user equipment according to claim 46, wherein the instruction to determining the first DMRS port according to the first E-PDCCH candidate and a first correspondence, comprises an instruction to determine the first DMRS port among multiple preset DMRS ports according to a formula $AP_{num}=(m+\sigma) \bmod P$ or a formula $AP_{num}=a+(m+\sigma) \bmod P$;

wherein, $AP_{num}$ is an index of the first DMRS port;

m is an index of the first E-PDCCH candidate, wherein m=0, 1, 2, . . . , M, and M is a quantity of E-PDCCH candidates on the first aggregation level to which the first E-PDCCH candidate belongs;

P is a quantity of the multiple DMRS ports;

$\sigma$ is an index offset value pre-allocated by a base station, and a value thereof is determined according to an identity of the UE corresponding to the first E-PDCCH candidate and the first aggregation level;

a is a constant; and mod is a modulo operator.

48. The user equipment according to claim 46, wherein the transceiver is further configured to receive, before receiving the reference signal on the subcarrier corresponding to the first DMRS port, first broadcast signaling or first RRC signaling transmitted by a base station, wherein the first broadcast signaling or first RRC signaling carries the first correspondence.

49. The user equipment according to claim 42, wherein the program to determine a first DMRS port corresponding to a reference signal corresponding to a first E-PDCCH candidate, comprises an instruction to determine the first DMRS port according to the eCCEs or CCEs in the first PRB resource and a second correspondence, wherein the second correspondence is a correspondence between an eCCE or a CCE and a DMRS port.

50. The user equipment according to claim 49, wherein the instruction to determine the first DMRS port according to the eCCEs or CCEs in the first PRB resource and a second correspondence, comprises an instruction to obtain, according to the second correspondence, a DMRS port corresponding to each eCCE or CCE in the first PRB resource, and use the DMRS port as the first DMRS port.

51. The user equipment according to claim 49, wherein the transceiver is further configured to receive, before receiving the reference signal on the subcarrier corresponding to the first DMRS port, second broadcast signaling or second RRC signaling transmitted by a base station, wherein the second broadcast signaling or second RRC signaling carries the second correspondence.

52. The user equipment according to claim 42, wherein the transceiver is further configured to receive, before receiving the reference signal on the subcarrier corresponding to the first DMRS port, third broadcast signaling or third RRC signaling transmitted by a base station, wherein the third broadcast signaling or third RRC signaling carries the reference DMRS port corresponding to each PRB or each PRB group in the first PRB resource.

\* \* \* \* \*